(12) United States Patent
Dhople et al.

(10) Patent No.: US 10,139,800 B2
(45) Date of Patent: Nov. 27, 2018

(54) DECENTRALIZED OPTIMAL DISPATCH OF PHOTOVOLTAIC INVERTERS IN POWER DISTRIBUTION SYSTEMS

(71) Applicant: Regents of the University of Minnesota, Minneapolis, MN (US)

(72) Inventors: Sairaj Dhople, Minneapolis, MN (US); Georgios B. Giannakis, Minnetonka, MN (US); Emiliano Dall'Anese, Arvada, CO (US)

(73) Assignee: Regents of the University of Minnesota, Minneapolis, MN (US)

( * ) Notice: Subject to any disclaimer, the term of this patent is extended or adjusted under 35 U.S.C. 154(b) by 295 days.

(21) Appl. No.: 15/061,515

(22) Filed: Mar. 4, 2016

(65) Prior Publication Data
US 2016/0259314 A1    Sep. 8, 2016

Related U.S. Application Data

(60) Provisional application No. 62/128,831, filed on Mar. 5, 2015.

(51) Int. Cl.
| | |
|---|---|
| G05B 19/10 | (2006.01) |
| H02J 3/00 | (2006.01) |
| H02M 7/44 | (2006.01) |
| H02J 3/18 | (2006.01) |
| H02J 3/38 | (2006.01) |
| H02J 13/00 | (2006.01) |

(52) U.S. Cl.
CPC .............. *G05B 19/102* (2013.01); *H02J 3/00* (2013.01); *H02J 3/18* (2013.01); *H02J 3/383* (2013.01); *H02M 7/44* (2013.01); *G05B 2219/2639* (2013.01); *H02J 13/0075* (2013.01); *H02J 13/0086* (2013.01); *H02J 2003/007* (2013.01); *Y02E 10/563* (2013.01); *Y02E 40/30* (2013.01); *Y02E 40/72* (2013.01); *Y02E 60/76* (2013.01); *Y04S 10/123* (2013.01); *Y04S 40/22* (2013.01)

(58) Field of Classification Search
CPC .................................................... G05B 19/102
USPC ........................................................ 700/295
See application file for complete search history.

(56) References Cited

U.S. PATENT DOCUMENTS

2013/0250635 A1* 9/2013 Sivakumar .............. H02J 3/383
363/71

OTHER PUBLICATIONS

Bacher et al., "Online short-term solar power forecasting," Solar Energy, vol. 83, El Sevier, Jul. 22, 2009, 14 pp.
Bai et al., "Semidefinite programming for optimal power flow problems," Electrical Power and Energy Systems, vol. 30, El Sevier, Dec. 18, 2007, 12 pp.
Baldick, "A Fast Distributed Implementation of Optimal Power Flow," IEEE Transactions on Power Systems, vol. 14, No. 3, Aug. 1999, 7 pp.

(Continued)

*Primary Examiner* — Anthony Ho
(74) *Attorney, Agent, or Firm* — Shumaker & Sieffert, P.A.

(57) ABSTRACT

Decentralized methods for computing optimal real and reactive power setpoints for residential photovoltaic (PV) inverters are described. Optimal power flow techniques are described that select which inverters will provide ancillary services and compute their optimal real and reactive power setpoints according to specified performance criteria and economic objectives.

20 Claims, 10 Drawing Sheets

(56) References Cited

OTHER PUBLICATIONS

Bienstock, "Chance Constrained Optimal Power: Risk-Aware Network Control Under Uncertainty," Cornell University Library, Feb. 4, 2013, 36 pp.
Bolognani, "A Distributed Control Strategy for Reactive Power Compensation in Smart Microgrids," IEEE Transactions on Automatic Control, vol. 58, No. 11, Nov. 2013, 16 pp.
Boyd et al., "Distributed Optimization and Statistical Learning via the Alternating Direction Method of Multipliers," Foundations and Trends in Machine Learning, NOW, vol. 3, No. 1, Jan. 2011, 125 pp.
Cady et al., "Engineering Systems in the Re_home: A Net-Zero, Solar-Powered House for the U.S. Department of Energy's 2011 Solar Decathlon," IEEE, retrieved from www.solardecathlon.iuuc.edu, Feb. 24-25, 2012, IEEE, 5 pp.
Cagnano et al, "Online Optimal Reactive Power Control Strategy of PV Inverters," IEEE Transactions on Industrial Electronics, vol. 58, No. 10, Oct. 2011, 12 pp.
Carvalho et al., "Distributed Reactive Power Generation Control for Voltage Rise Mitigation in Distribution Networks," IEEE Transactions on Power Systems, vol. 23, No. 2, May 2008, 7pp.
Chassin et al., "Load Modeling and Calibration Techniques for Power System Studies," North American Power Symposium (NAPS), Aug. 4-6, 2011, 7 pp.
Craciun et al., "Evaluation of Ancillary Services Provision Supply," $22^{nd}$ International Conference on Electricity Distribution, CIRED, Jun. 10-13, 2013, 4 pp.
Dall'Anese et al., "Risk-Constrained Microgrid Reconfiguration Using Group Sparsity," IEEE Transactions on Sustainable Energy, vol. 5, Issue 4, Jun. 19, 2014, 10 pp.
Dall'Anese et al., "Optimal Dispatch of Photovoltaic Inverters in Residential Distribution Systems," IEEE Transactions on Energy Conversion, vol. 5, No. 2, Apr. 2014, 11 pp.
Dall'Anese et al., "Optimal Distributed Generation Placement in Distribution Systems via Semidefinite Relaxation," Asilomer Conference on Signals, Systems, and Computers, Nov. 3-6, 2013, 5 pp.
Dall'Anese et al., "Sparsity-Leveraging Reconfiguration of Smart Distribution Systems," IEEE Transactions on Power Delivery, vol. 29, No. 3, Jun. 2014, 10 pp.
Dhople et al., "Engineering Systems in the Gable Home: A Passive, Net-Zero, Solar-Powered House for the U.S. Department of Energy's 2009 Solar Decathlon," Power and Energy Conference at Illinois, IEEE, Feb. 12-13, 2010, 5 pp.
Erseghe et al., "Fast Consensus by the Alternating Direction Multipliers Method," IEEE Transactions on Signal Processing, vol. 59, No. 11, Nov. 2011, 15 pp.
Erseghe et al., "Distributed Optimal Power Flow Using ADMM," IEEE Transactions on Power Systems, vol. 29, No. 5, Sep. 2014, 11 pp.
Farivar et al., "Branch Flow Model: Relaxations and Convexification—Part I," IEEE Transactions on Power Systems, vol. 28, No. 3, Aug. 2013, 11 pp.
Farivar et al., "Optimal Inverter VAR Control in Distribution Systems with High PV Penetration," Power and Energy Society, IEEE, Jul. 22-26, 2012, 7 pp.
Gatsis et al., "Residential Load Control: Distributed Scheduling and Convergence with Lost AMI Messages," Transactions on Smart Grid, vol. 3, No. 2, IEEE, Jun. 2012, 17 pp.
Grone et al., "Positive Definite Completions of Partial Hermitian Matrices," Elsevier, vol. 58, Apr. 1984, 16 pp.
Hug-Glanzmann et al., "Decentralized Optimal Power Flow Control for Overlapping Areas in Power Systems," Transactions on Power Systems, vol. 24, No. 1, IEEE, Feb. 2009, 10 pp.
IEEE Standard for Interconnecting Distributed Resources with Electric Power Systems, IEEE Std 1547, Standards Coordinating Committee 21, Jul. 28, 2003, 27 pp.
Jabr et al., "Exploiting Sparsity in SDP Relaxations of the OPF Problem," IEEE Transactions on Power Systems, vol. 27, No. 2, May 2012, 2 pp.

Jahangiri et al., "Distributed Volt/VAr Control by PV Inverters," Transactions on Power Systems, vol. 28, No. 3, IEEE, Aug. 2013, 11 pp.
Kekatos et al., "Distributed Robust Power System State Estimation," Transactions on Power Systems, vol. 28, No. 2, IEEE, May 2013, 10 pp.
Kersting et al., Radial distribution test feeders, Power Engineering Society Winter Meeting, IEEE, Jan. 28-Feb. 1, 2001, 5 pp.
Key et al., Inverters to provide grid support (DG and Storage), Electric Power Research Institute, Dec. 3, 2012, 17 pp.
King et al., "Performance Model for Grid-Connected Photovoltaic Inverters," Sandia Report, Sandia National Laboratories, Sep. 2007, 47 pp.
Kloppel et al., "Chance Constrained Optimal Power Flow with Non-Gaussian Distributed Uncertain Wind Power Generation," 12th International Conference on Environment and Electrical Engineering, May 5-8, 2013, 6 pp.
Stez et al., "Cost Optimal sizing of Photovoltaic Inverters—Influence on new grid codes and cost reductions," ResearchGate, Feb. 25, 2015, 7 pp.
Lam et al., "Optimal distributed voltage regulation in power distribution networks.," IEEE, Jan. 27, 2014, 24 pp.
Lavaei et al., "Geometry of power flows and optimization in distributed networks.," Transactions on Power Systems, vol. 29, No. 2, IEEE, Mar. 2014, 12 pp.
Lavaei et al., "Zero Duality Gap in Optimal Power Flow Problem," Transactions on Power Systems, vol. 27, No. 1, Feb. 2012, 16 pp.
Liu et al., "Distribution System Voltage Performance Analysis for High-Penetration Photovoltaics," National Renewable Energy Laboratory, Subcontract Report, NREL/SR-581-42298, Feb. 2008, 46 pp.
Lorenz et al., "Irradiance Forecasting for the Power Prediction of Grid-Connected Photovoltaic Systems," Journal of Selected Topics in Applied Earth Observations and Remove Sensing, vol. 2, No. 1, IEEE, Mar. 2009, 9 pp.
Luo et al., "Semidefinite Relaxation of Quadratic Optimization Problems," IEEE Signal Processing Magazine, May 2010, 15 pp.
Mahmud et al., "Voltage Control of Distribution Networks with Distributed Generation using Reactive Power Compensation," 37th Annual Conference of IEEE Industrial Electronics Society, Nov. 7-10, 2011, 6 pp.
Molzahn et al., "Approximate Representation of ZIP Loads in a Semidefinite Relaxation of the OPF Problem," Transactions on Power Systems, vol. 29, No. 4, IEEE, Jul. 2014, 2 pp.
Nogales et al., "A Decomposition Methodology Applied to the Multi-Area Optimal Power Flow Problem.,"Kluwer Academic Publishers, vol. 120, Issue 1, Apr. 2003, 18 pp.
Ntakou et al., "Price Discovery in Dynamic Power Markets with Low-Voltage Distribution-Network Participants," T&D Conference and Exposition, Apr. 14-17, 20104, 5 pp.
Paudyal et al., "Three-phase Distribution OPF in Smart Grids: Optimality versus Computational Burden," International Conference and Exhibition on Innovative Smart Grid Technologies, IEEE, Dec. 5-7, 2011, 7 pp.
Puig et al., "Multidimensional Shrinkage-Threshold Operator and Group LASSO Penalties," IEEE Signal Processing Letters, vol. 18, No. 6, Jun. 2011, 8 pp.
Rajawat et al., "Dynamic Network Delay Cartography," Transactions on Information Theory, vol. 60, No. 5, IEEE, May 2014, 11 pp.
Robbins et al., "A Two-Stage Distributed Architecture for Voltage Control in Power Distribution Systems," IEEE Transactions on Power Systems, vol. 28, No. 2, May 2012, 13 pp.
Rockafellar et al., "Optimization of conditional value-at-risk," Journal of Risk, vol. 2, No. 3, 2000, 21 pp. (Applicant points out, in accordance with MPEP 609.04(a), that the year of publication, 2000, is sufficiently earlier than the effective U.S. filing date, Mar. 4, 2016, so that the particular month of publication is not in issue.).
Samadi et al., "Coordinated Active Power-Dependent Voltage Regulation in Distribution Grids with PV Systems," Transactions on Power Delivery, vol. 29, No. 3, IEEE, Jun. 2014, 11 pp.
Samadi et al., "Optimal Real-time Pricing Algorithm Based on Utility Maximization for Smart Grid," International Conference on Smart Grid Communications, IEEE, Oct. 4-6, 2010, 6 pp.

(56) References Cited

OTHER PUBLICATIONS

Sjodin et al., "Risk-Mitigated Optimal Power Flow for Wind Powered Grids," International Conference on Smart Grid Communications, Oct. 4-6, 2010, 7 pp.
Sulc et al., "Optimal Distributed Control of Reactive Power via the Alternating Direction Method of Multipliers," Transactions on Energy Conversion, vol. 29, Issue, 4, IEEE, Dec. 2014, 10 pp.
Summers et al., "Stochastic Optimal Power Flow based on Convex Approximations of Chance Constraints," Power Systems Computation Conference, IEEE, Aug. 18-22, 2014, 7 pp.
Tibshirani et al., "Regression Shrinkage and Selection via the Lasso," Royal Statistical Society, Jan. 1995, 22 pp.
Tonkoski et al., "Impact of High PV Penetration on Voltage Profiles in Residential Neighborhoods," Transactions on Sustainable Energy, vol. 3, No. 3, IEEE, Jul. 2012, 10 pp.
Tonkoski et al., "Coordinated Active Power Curtailment of Grid Connected PV Inverters for Overvoltage Prevention," Transactions on Sustainable Energy, vol. 2 No. 2, IEEE, Apr. 2011, 9 pp.
Tonkoski et al., "Impact of active power curtailment on overvoltage prevention and energy production of PV inverters connected to low voltage residential feeders," Renewable Energy vol. 36, Issue 12, Elsevier, Dec. 2011, 9 pp.
Turitsyn et al., "Options for Control of Reactive Power by Distributed Photovoltaic Generators," Contributed Paper, vol. 99, No. 6, IEEE, Jun. 2011, 11 pp.
Vizoso et al., "A Photovoltaic Power Unit providing Ancillary Services for Smart Distribution Networks," European Association for the Development of Renewable Energies, International Conference on Renewable Energies and Power Quality (ICREPQ'11), Apr. 13-15, 2010, 6 pp.
Wang et al., "A Chance-Constrained Two-Stage Stochastic Program for Unit Commitment with Uncertain Wind Power Output," Transactions on Power Systems, vol. 27, No. 1, IEEE, Feb. 2012, 10 pp.
Vandenberghe et al., "Semidefinite Programming," SIAM Review, A publication of the Society for Industrial and Applied Mathematics, vol. 38, No. 1, Mar. 1996, 48 pp.
Yuan et al., Model selection and estimation in regression with grouped variables, Royal Statistical Society, Aug. 2005, 19 pp.
Zhang et al., "An Optimal and Distributed Method for Voltage Regulation in Power Distribution Systems," Transactions on Power Systems, vol. 30, No. 4, Jul. 2015, 13 pp.
Zhang et al., "Robust Optimal Power Flow with Wind Integration Using Conditional Value-at-Risk," Conference on Smart Grid Communications, Symposiums—Support for Storage, Renewable Resources and Micro-grids, IEEE, Oct. 21-24, 2013, 6 pp.
Zhu et al., "Multi-area State Estimation using Distributed SDP for Nonlinear Power Systems," Architectures and Modeling for the Smart Grid, IEEE, Nov. 5-8, 2012, 6 pp.
Dall'Anese et al., "Distributed Optimal Power Flow for Smart Microgrids," IEEE Transactions on Smart Grid, vol. 4, No. 3, Sep. 2013, 12 pp.
Dall'Anese, "Optimal operation of distribution systems with increased renewable generation," University of Nevada, Reno, NV, Feb. 18, 2014, Feb. 24, 2014 Lehigh University, Bethlehem, PA, Feb. 28, 2014 University of Vermont, Burlington, VT, Mar. 5, 2014 at the University of New York, Amherst, NY, and Apr. 1, 2014 Northeastern University, Boston, MA, 142 pp.
Dall'Anese et al., "Optimal Dispatch of Residential Photovoltaic Inverters Under Forecasting Uncertainties," Journal of Photovoltaics, vol. 5, No. 1, Jan. 2015, 10 pp.
Dall'Anese et al., "Decentralized Optimal Dispatch of Photovoltaic Inverters in Residential Distribution Systems," IEEE Transactions on Energy Conversion, vol. 29, No. 4, Dec. 2014, 11 pp.
Dall'Anese et al., "Optimization of Unbalanced Power Distribution Networks via Semidefinite Relaxation," North American Power Symposium, Sep. 9-11, 2012, 6 pp.
Warrington et al., "Policy-Based Reserves for Power Systems," Transactions on Power Systems, vol. 28, No. 4, IEEE, Nov. 2013, 11 pp.
Nerc, 2012 "Special Assessment: Interconnection Requirements for Variable Generation," Sep. 2012, 124 pp.
Zhu et al., "Distributed In-Network Channel Decoding," Transactions on Signal Processing, vol. 57, No. 10, IEEE, Oct. 2009, 14 pp.

\* cited by examiner

DECENTRALIZED OPTIMAL DISPATCH OF PHOTOVOLTAIC INVERTERS IN POWER DISTRIBUTION SYSTEMS

This application claims the benefit of U.S. Provisional Patent Application No. 62/128,831, filed Mar. 5, 2015, the entire contents of which are incorporated herein by reference.

TECHNICAL FIELD

The invention relates to photovoltaic (PV) systems including residential-scale systems.

BACKGROUND

Deployment of photovoltaic (PV) systems in residential settings promises a multitude of environmental and economic advantages, including a sustainable capacity expansion of distribution systems. However, a unique set of challenges related to power quality, efficiency, and reliability may emerge, especially when an increased number of PV systems are deployed in existing distribution networks, and operate according to current practices. One challenge is associated with overvoltages when PV generation exceeds demand. To ensure reliable operation of existing distribution feeders even during peak PV generation hours, recent efforts have focused on the possibility of inverters providing ancillary services.

Secondary-level control of PV inverters can alleviate extenuating circumstances such as overvoltages during periods when PV generation exceeds the household demand, and voltage transients during rapidly varying atmospheric conditions. Initiatives to upgrade inverter controls and develop business models for ancillary services are currently underway in order to facilitate large-scale integration of renewables while ensuring reliable operation of existing distribution feeders Examples of ancillary services include reactive power compensation, which has been recognized as a viable option to effect voltage regulation at the medium-voltage distribution level. The amount of reactive power injected or absorbed by inverters can be computed based on either local droop-type proportional laws, or optimal power flow (OPF) strategies. Either way, voltage regulation with these approaches comes at the expense of low power factors at the substation and high network currents, with the latter leading to high power losses in the network.

SUMMARY

In general, this disclosure describes a systematic and unifying optimal inverter dispatch (OID) techniques for determining the active- and reactive-power set points for PV inverters in distribution systems, with the objective of optimizing the operation of power distribution feeders while increasing the network resiliency and reliability. The techniques described herein facilitates high PV-system integration in both residential and commercial settings with optimality, reliability and power-quality guarantees, and accommodates business models for PV-owners willing to participate in energy market operations.

Power distribution networks were traditionally designed to transfer power from the distribution substation (i.e., the point of interconnection with the bulk transmission grid) to residential neighborhoods and commercial premises, without accounting for possible local power generation at end users. With the proliferation of roof-top PV systems, operating with standard protocols and practices (e.g., all the active power harvested is injected in the network, and inverters do not produce reactive power), result in a unique set of challenges related to power quality, efficiency, and reliability. In particular, overvoltages during periods when PV generation exceeds the demand, and voltage sags during rapidly-varying ambient conditions are emerging as pressing concerns in distribution system management. In this context, OID represents a viable and powerful option for upgrading power distribution system operations and control by heralding the next generation of grid-interactive protocols in PV inverters.

Decentralized methods for computing optimal real and reactive power setpoints for residential photovoltaic (PV) inverters are described. Conventional PV inverter controllers, which are designed to extract maximum power at unity power factor, cannot address secondary performance objectives such as voltage regulation and network loss minimization. Optimal power flow techniques are described that select which inverters will provide ancillary services and compute their optimal real and reactive power setpoints according to specified performance criteria and economic objectives. Leveraging advances in sparsity-promoting regularization techniques and semidefinite relaxation, this disclosure shows how such problems can be solved with reduced computational burden and optimality guarantees. To enable large-scale implementation, example implementations are described based on the so-called alternating direction method of multipliers by which optimal power flow-type problems in this setting can be systematically decomposed into sub-problems that can be solved in a decentralized fashion by the utility and customer-owned PV systems with limited exchanges of information. Since the computational burden is shared among multiple devices and the requirement of all-to-all communication can be circumvented, the described optimization approaches scale favorably to large distribution networks.

The described techniques may provide a number of technical advantages. For example, techniques described herein provide increased flexibility over conventional techniques by, for example, invoking a joint optimization of both active and reactive powers; based on prevailing ambient conditions and load demand, OID determines the PV-inverter active- and reactive-power set points, so that the network operation may be optimized according to specified criteria (e.g., minimizing power losses as well as maximize economic objectives and social welfare), while ensuring adherence to pertinent electrical and security constraints.

Moreover, the techniques may be used to select the subset of PV-inverters that most strongly impacts voltages, network performance objectives, and social welfare, and quantifies the optimal setpoints for those inverters. Inverters that are not selected by techniques are allowed to operate in a business-as-usual mode.

In one embodiment, a system comprises a control device for a power utility and a plurality of customer sites having respective photovoltaic inverters coupled to the power utility by a power distribution network. The control device stores an optimal inverter dispatch (OID) model for controlling real and reactive power produced by photovoltaic inverters installed at the customer sites, the OID model specifying a set of one or more cost constraints for the utility. The control device is configured to receive messages from each of the customer sites, wherein each of the messages specify current measurements for the amount of reactive power and reactive power currently being produced by the photovoltaic inverter installed at the respective customer site, determine, based on the OID model and the current measurements, set points for the active power and reactive power to be produced by each of the photovoltaic inverters of the customer sites by performing a minimization operation over the cost constraints for the utility, and communicate the updated set points for the active power and the reactive power to photovoltaic inverters.

In another embodiment, a method comprises storing, with a control device, an optimal inverter dispatch (OID) model for controlling the real and reactive power produced by photovoltaic inverters installed at respective customer sites and connected to a utility by a power distribution network, wherein the model includes data representing estimated voltages at nodes within the power distribution network and an amount of active and reactive power currently being produced by each of the photovoltaic inverters, and wherein the OID model specifies a set of one or more cost constraints for the utility. The method includes receiving, with the control device, messages from each of the customer sites, wherein each of the messages specify current measurements for the amount of reactive power and reactive power currently being produced by the photovoltaic inverter installed at the respective customer site, determining, based on the OID model and the current measurements, set points for the active power and reactive power to be produced by each of the photovoltaic inverters of the customer sites by performing a minimization operation over the cost constraints for the utility, and communicating the updated set points for the active power and the reactive power to photovoltaic inverters.

In another embodiment, a method comprises measuring, with a controller at a customer site, an amount of active power and reactive power currently being produced by a photovoltaic inverter installed at the customer site. The method further includes receiving, with the controller, messages from a control device of a utility coupled to the customer site by a power distribution network, wherein the messages specify set points for the amount of reactive power and reactive power to be produced by the photovoltaic inverter installed at the respective customer site, computing, with the controller, local set points based on a difference between the set points for the reactive power and the reactive power as received from the control device and the measured reactive power and reactive power currently being produced by the photovoltaic inverters, and controlling the respective photovoltaic inverter in accordance with the local set points for the reactive power and the reactive power.

In another embodiment, the invention is directed to a computer-readable medium containing instructions. The instructions cause a programmable processor to implement the operations and functions described herein.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
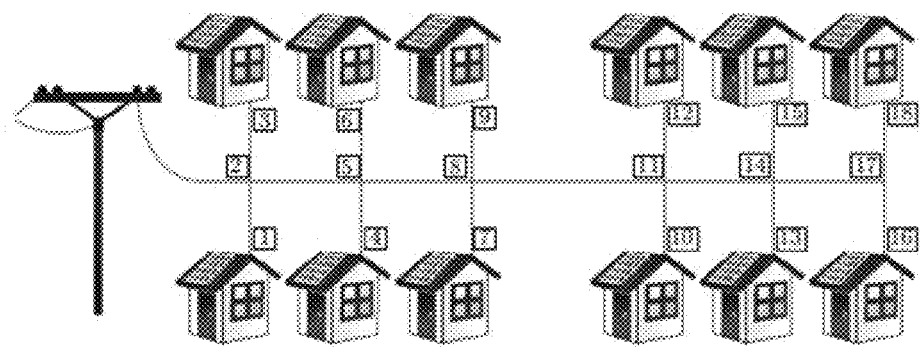
FIG. 1 is a block diagram of an example low-voltage residential network with high PV penetration.

FIG. 1 is a block diagram of an example low-voltage residential network with high penetration of photovoltaic inverters (PVs). Techniques for distributed optimal inverter dispatch (DOID) are described. In example implementations, a subset of critical PV-inverters that most strongly impact network performance objectives are identified and their active (real) and reactive power set points are jointly computed. This can be accomplished by formulating an optimal power flow (OPF) type problem, which encapsulates well-defined performance criteria as well as network and inverter operational constraints. By leveraging sparsity-promoting regularizations and semidefinite relaxation (SDR) techniques, the technical problems are solved in a distributed manner with reduced computational burden.

The techniques provide increased flexibility over conventional Volt/VAR approaches and conventional active power curtailment methods. For example, the techniques may: i) determine in real-time those inverters that must participate in ancillary services provisioning; and, ii) jointly optimize both the real and reactive power produced by the participating inverters (see, e.g., FIGS. 3 (c)-(d) for an illustration of the inverters' operating regions under OID).

In this disclosure, the technical problem is strategically decomposed into sub-problems that can be solved in a decentralized fashion by control devices associated with and deployed at utility-owned energy systems and customer-owned PV systems, with reduced exchanges of information. Herein, the decentralized optimization techniques are referred to as decentralized optimal inverter dispatch (DOID). By leveraging both real and reactive power optimization and decentralized solution approaches for OPF problems, a number of decentralized techniques are described herein.

For example, in a first implementation, controllers for all customer-owned PV inverters communicate with the control device for the utility. The control device for the utility executes operations to implement the techniques described herein to optimize network performance (quantified in terms of, e.g., power losses and voltage regulation) while controllers deployed at individual customer sites maximize their customer-specified economic objectives (quantified in terms of, e.g., the amount of active power they might have to curtail). This setup provides flexibility to the customers to specify their optimization objectives since the utility need not control the customer preferences. In the spirit of the advanced metering infrastructure (AMI) paradigm, according to the techniques described herein, utility and customer-owned EMUs exchange relevant information to agree on the optimal PVinverter setpoints. The process continues until the decentralized algorithms implemented by the utility control device and the customer controllers have converged such that the set points computed by the power utility converge to a threshold difference from the set points computed by the inverter controllers at the customer sites.

In a second example implementation of the DOID techniques, the distribution network is partitioned into clusters, each of which contains a set of customer-owned PV inverters and a single cluster energy manager (CEM). A decentralized algorithm is then formulated and implemented such that the operation of each cluster is optimized and with a limited exchange of voltage-related messages, the interconnected clusters consent on the system-wide voltage profile. In one example, the decentralized OID techniques leverage the alternating direction method of multipliers (ADMM), which is an algorithm that solves complex optimization problems by breaking them into smaller pieces. Further example details of ADMM are described in Boyd, N. Parikh, E. Chu, B. Peleato, and J. Eckstein, "Distributed optimization and statistical learning via the alternating direction method of multipliers," Foundations and Trends in Machine Learning, vol. 3, pp. 1-122, 2011, the entire contents of which are incorporated herein by reference. In general, the message exchange process described above continues until the set points computed by the power utility/aggregator converge to a threshold difference from the set points computed by the customer controller, and the difference between matrices specifying voltages of power lines connecting neighboring clusters converge to a threshold difference.

The decentralized OID techniques described herein accommodate different message passing strategies that are relevant in a variety of practical scenarios (e.g., customer-to-utility, customer-to-CEM and CEM-to-CEM communications). The described decentralized techniques offer improved optimality guarantees, since example implementations are grounded on semidefinite relaxation. Moreover, the described techniques consider the utilization of an exact AC power flow model, as well as a joint computation of active and reactive power setpoint.

Network and PV-Inverter Models

In the example of FIG. 1, node 0 corresponds to the secondary of the step-down transformer; set $\mathcal{U} = \{2, 5, 8, 11, 14, 17\}$ collects nodes corresponding to distribution poles; and, homes $H_1, \ldots, H_{12}$ are connected to nodes in the set $\mathcal{H} = \{1, 3, 4, 6, 7, 9, 10, 12, 13, 15, 16, 18\}$.

With respect to FIG. 1, consider the distribution system comprising N+1 nodes collected in the set $\mathcal{N} := \{0, 1, \ldots, N\}$ (node 0 denotes the secondary of the step-down transformer), and lines represented by the set of edges $\varepsilon := \{(m, n)\} \subset \mathcal{N} \times \mathcal{N}$. For simplicity of exposition, a balanced system is considered; however, both the centralized and decentralized frameworks proposed subsequently can be extended to unbalanced systems. Subsets $\mathcal{U}, \mathcal{H} \subset \mathcal{N}$ collect nodes corresponding to utility poles (with zero power injected or consumed), and those with installed residential PV inverters, respectively (see FIG. 1).

Figure 2:
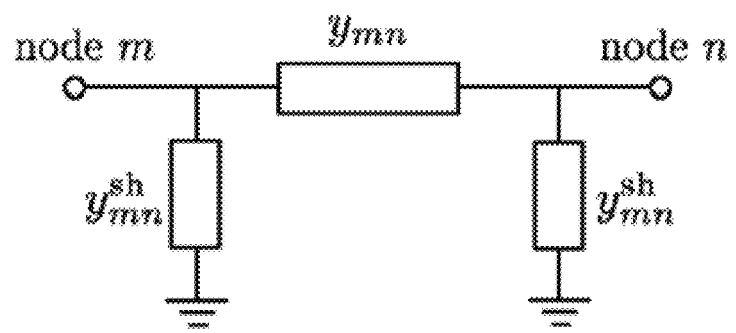
FIG. 2 is a block diagram illustrating $\pi$-equivalent circuits of a low-voltage distribution line (m; n)$\in\varepsilon$.

Let $V_n \in \mathbb{C}$ and $I_n \in \mathbb{C}$ denote the phasors for the line-to-ground voltage and the current injected at node $n \in \mathcal{N}$, respectively, and define $i := [I_1, \ldots, I_N]^T \in \mathbb{C}^N$ and $v := [V_1, \ldots, V_N]^T \in \mathbb{C}^N$. Using Ohm's and Kirchhoff's circuit laws, the linear relationship $i = Yv$ can be established, where the system admittance matrix $Y \in \mathbb{C}^{N+1 \times N+1}$ is formed based on the system topology and the $\pi$-equivalent circuit of lines $(m, n) \in \varepsilon$, as illustrated in FIG. 2. Specifically, with $y_{mn}$ and $y_{mn}^{sh}$ denoting the series and shunt admittances of line $(m, n)$, the entries of Y are defined as $$[Y]_{m,n} := \begin{cases} \sum_{j \in \mathcal{N}_m} y_{mj}^{sh} + y_{mj}, & \text{if } m = m \\ -y_{mn}, & \text{if}(m, n) \in \varepsilon \\ 0, & \text{otherwise} \end{cases}$$

where, $\mathcal{N}_m := \{j \in \mathcal{N} : (m, j) \in \varepsilon\}$ denotes the set of nodes connected to the m-th one through a distribution line.

Figure 3A:
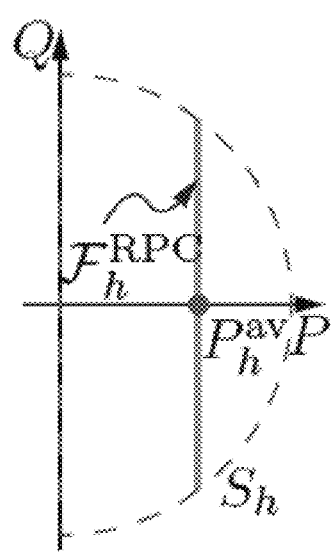
FIGS. 3A-3D are graphs illustrating feasible operating regions for the $h^{th}$ inverter with apparent power rating $S_h$ under a) reactive power control (RPC), b) active power curtailment (APC), c) OID with joint control of real and reactive power, and d) OID with a lower-bound on power factor.
Figure 3B:
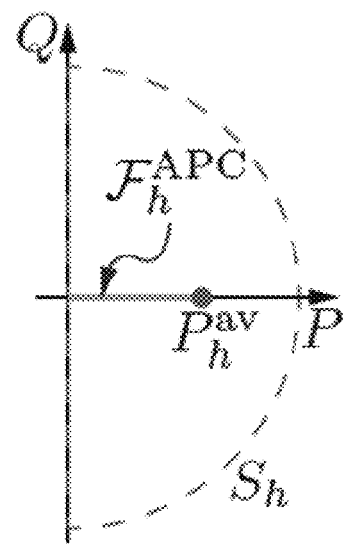
Figure 3C:
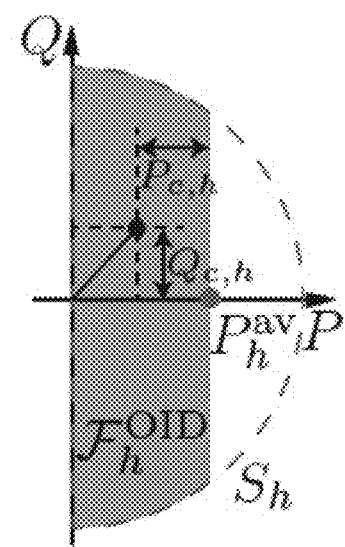
Figure 3D:
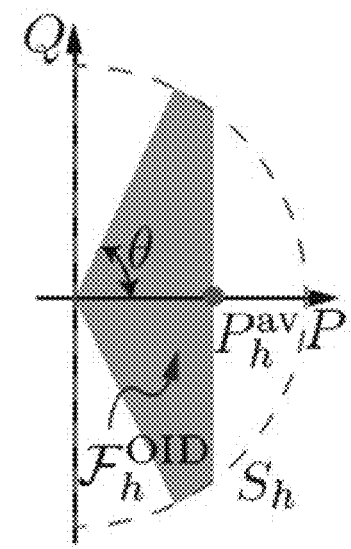

A constant PQ model is adopted for the load, with $P_{l,h}$ and $Q_{l,h}$ denoting the active and reactive demands at node $h \in \mathcal{H}$, respectively. In general, the PQ model asserts that the demand from a household or a commercial premise is represented by given values for the consumed real and reactive powers. For given solar irradiation conditions, let Pr denote the maximum available active power from the PV array at node $h \in \mathcal{H}$. The described framework calls for the joint control of both real and reactive power produced by each of the PV inverters. In particular, the allowed operating regime on the complex-power plane for the PV inverters is illustrated in FIG. 3D and described by $$\mathcal{F}_h^{OID} := \begin{cases} 0 \leq P_{c,h} \leq P_h^{av} \\ P_{c,h}, Q_{c,h} : Q_{c,h}^2 \leq S_h^2 - (P_h^{av} - P_{c,h})^2 \\ |Q_{c,h}| \leq \tan\theta(P_h^{av} - P_{c,h}) \end{cases} \quad (1)$$

where $P_{c,h}$ is the active power curtailed, and $Q_{c,h}$ is the reactive power injected/absorbed by the inverter at node h. Notice that if there is no limit to the power factor, then $\theta = \pi/2$, and the operating region is given by FIG. 3C. In particular, FIGS. 3A-3D are graphs illustrating feasible operating regions for the $h^{th}$ inverter with apparent power rating $S_h$ under a) reactive power control (RPC), b) active power curtailment (APC), c) OID with joint control of real and reactive power, and d) OID with a lower-bound on power factor.

The techniques described herein provide for joint optimization of active and reactive powers generated by the PV inverters, and offer the flexibility of selecting the subset of critical PV inverters that should be dispatched in order to fulfill optimization objectives and ensure electrical network constraints. To this end, let $z_h$ be a binary variable indicating whether PV inverter h provides ancillary services or not and assume that at most $K<|\mathcal{H}|$ PV inverters are allowed to provide ancillary services. Selecting a (possibly time-varying) subset of inverters promotes user fairness, prolongs inverter lifetime, and captures possible fixed-rate utility-customer pricing/rewarding strategies. Let $p_c$ and $q_c$ collect the active powers curtailed and the reactive powers injected/absorbed by the inverters. With these definitions, the OID problem can be formulated as follows:

$$\min_{v,i,p_c,q_c,\{z_h\}} C(V, p_c) \quad (2a)$$

subject to $$i = Yv, \{z_h\} \in \{0, 1\}^{|\mathcal{H}|},$$

and $$V_h I_h^* = (P_h^{av} - P_{c,h} - P_{l,h}) + j(Q_{c,h} - Q_{l,h}) \quad (2b)$$

$$V_n I_n^* = 0 \quad \forall_n \in \mathcal{U} \quad (2c)$$

$$V^{min} \le |V_n| \le V^{max} \quad \forall_n \in \mathcal{N} \quad (2d)$$

$$(P_{c,h}, Q_{c,h}) \in \begin{cases} \{(0,0)\}, & \text{if } z_h = 0 \\ \mathcal{F}_h^{OID}, & \text{if } z_h = 1 \end{cases} \quad \forall_n \in \mathcal{H} \quad (2e)$$

$$\Sigma_{h \in \mathcal{H}} z_h \le K, \quad (2f)$$

where constraint (2b) is enforced at each node $h \in \mathcal{H}$; $C(V, p_c)$ is a given cost function capturing both network- and customer-oriented objectives; and, (2e)-(2f) jointly indicate which inverters have to operate either under OID (i.e., $(P_{c,h}, Q_{c,h}) \in \mathcal{F}_h^{OID}$), or, in the business-as-usual mode (i.e., $(P_{c,h}, Q_{c,h})=(0,0)$). An alternative problem formulation can be obtained by removing constraint (2f), and adopting the cost $C(V, p_c) + \lambda_z \Sigma_{h \in \mathcal{H}} z_h$ in (2a), with $\lambda_z \ge 0$ a weighting coefficient utilized to trade off achievable cost $C(V, p_c)$ for the number of controlled inverters. When $\lambda_z$ represents a fixed reward for customers providing ancillary services and $C(V, p_c)$ models costs associated with active power losses and active power set points, OID (2) returns the inverter setpoints that minimize the economic cost incurred by feeder operation.

In the OPF-type problem formulation, the power balance and lower bound on the voltage magnitude constraints (2b), (2c) and (2d), respectively, render the OID problem nonconvex, and thus challenging to solve optimally and efficiently. Unique to the OID formulation are the binary optimization variables $\{z_h\}$; finding the optimal (sub)set of inverters to dispatch involves the solution of combinatorially many subproblems. Nevertheless, a computationally affordable convex reformulation is applied by leveraging sparsity-promoting regularization and semidefinite relaxation (SDR) techniques as briefly described next.

In order to bypass binary selection variables, key is to notice that that if inverter h is not selected for ancillary services, then one clearly has that $P_{c,h}=Q_{c,h}=0$[cf. (2e)]. Thus, for $K<|\mathcal{H}|$, one has that the $2|\mathcal{H}| \times 1$ real-valued vector $[P_{c,1}, Z_{c,1}, \ldots, P_{c,|\mathcal{H}|}, Q_{c,|\mathcal{H}|}]^T$ is group sparse; meaning that, either the $2 \times 1$ sub-vectors $[P_{c,h}, Q_{c,h}]^T$ equal 0 or not. This group-sparsity attribute enables discarding the binary variables and to effect PV inverter selection by regularizing the cost in (2) with the following function:

$$G(p_c, q_c) := \lambda \Sigma_{h \in \mathcal{H}} \|[P_{c,h}, Q_{c,h}]^T\|_2 \quad (3)$$

where $\lambda \ge 0$ is a tuning parameter. Specifically, the number of inverters operating under OID decreases as $\lambda$ is increased.

To develop a relaxation of the OID task, powers and voltage magnitudes are expressed as linear functions of the outer-product Hermitian matrix $V := vv^H$, and the OID problem is reformulated with cost and constraints that are linear in V, as well as the constraints $V \ge 0$ and rank $(V)=1$. The resultant problem is still nonconvex because of the constraint rank $(V)=1$; however in the spirit of SDR, this constraint can be dropped.

To this end, define the matrix $Y_n := e_n e_n^T Y$ per node n, where $\Delta e_n\}_{n \in \mathcal{N}}$ denotes the canonical basis of $\mathbb{R}^{|\mathcal{N}|}$. Based on $Y_n$, define also the Hermitian matrices $A_n := \frac{1}{2}(Y_n + Y_n^H)$, $B_n := j/2(Y_n + Y_n^H)$, and $M_n := e_n e_n^T$. Using these matrices, along with (3) the relaxed convex OID problem can be formulated as $$\min_{v,p_c,q_c} C(V, p_c) + G(p_c, q_c) \quad (4a)$$

s to $V \ge 0$, and $$Tr(a_h V) = -P_{l,h} + p_h^{av} - P_{c,h} \quad \forall h \in \mathcal{H} \quad (4b)$$

$$Tr(B_h V) = -Q_{l,h} + Q_{c,h} \quad \forall h \in \mathcal{H} \quad (4c)$$

$$Tr(A_n V) = 0, Tr(B_n V) = 0 \quad \forall n \in \mathcal{U} \quad (4d)$$

$$V_{min}^2 \le Tr(M_n V) \le V_{max}^2 \quad \forall n \in \mathcal{N} \quad (4e)$$

$$(P_{c,h}, Q_{c,h}) \in \mathcal{F}_h^{OID} \quad \forall h \in \mathcal{H} \quad (4f)$$

If the optimal solution of the relaxed problem (4) has rank 1, then the resultant voltages, currents, and power flows are globally optimal for given inverter setpoints. As for the inverter setpoints $\{(P_h^{a,v} - P_{c,h}, Q_{c,h})\}$, those obtained from (4) may be slightly sub-optimal compared to the setpoints that would have been obtained by solving the optimization problem (2). This is mainly due to the so-called "shrinkage effect" introduced by the regularizer (3).

To solve the OID problem, customers' loads and available powers $\{P_h^{av}\}$ are gathered at a processing unit (managed by the utility company), which subsequently dispatches the PV inverter setpoints. Decentralized implementations of the OID framework are described below so that the OID problem can be solved in a decentralized fashion with limited exchange of information. From a computational perspective, decentralized schemes ensure scalability of problem complexity with respect to the system size.

DOID: Utility-Customer Message Passing

Consider decoupling the cost $C(V, p_c)$ in (4a) as $C(V, p_c) = C_{utility}(V, p_c) + \Sigma_h R_h(P_{c,h})$, where $C_{utility}(V, p_c)$ captures utility-oriented optimization objectives, which may include e.g., power losses in the network and voltage deviations; and, $R_h(P_{c,h})$ is a convex function modeling the cost incurred by (or the reward associated with) customer h when the PV inverter is required to curtail power. Without loss of generality, a quadratic function $R_h(P_{c,h}) := a_h P_{c,h}^2 + b_h P_{c,h}$ is adopted here, where the choice of the coefficients is based on specific utility-customer prearrangements or customer specified preferences.

Suppose that customer h transmits to the utility company the net active power $\overline{P}_h := P_{l,h} + P_h^{av}$ and the reactive load $Q_{l,h}$; subsequently, customer and utility will agree on the PV-inverter setpoint, based on the optimization objectives described by $C_{utility}$ and $\{R_h\}$. To this end, let $\overline{P}_{c,h}$ and $\overline{Q}_{c,h}$ represent copies of $P_{c,h}$ and $Q_{c,h}$, respectively, at the utility. The corresponding $|\mathcal{H}| \times 1$ vectors that collect the copies of the inverter setpoints are denoted by $\overline{p}_c$ and $\overline{q}_c$, respectively. Then, using the additional optimization variables $\overline{p}_c, \overline{q}_c$, the relaxed OID problem (4) can be equivalently reformulated as:

$$\min_{\substack{V, p_c, q_c \\ \overline{p}_c, \overline{q}_c}} \overline{C}(V, \overline{p}_c, \overline{q}_c) + \sum_{h \in \mathcal{H}} R_h(P_{c,h}) \quad (5a)$$

s. to $V \succeq 0$, and $$Tr(A_h V) = \overline{P}_h - P_{c,h} \quad \forall\, h \in \mathcal{H} \quad (5b)$$

$$Tr(B_h V) = -Q_{l,h} + \overline{Q}_{c,h} \quad \forall\, h \in \mathcal{H} \quad (5c)$$

$$Tr(A_n V) = 0,\; Tr(B_n V) = 0 \quad \forall\, n \in \mathcal{U} \quad (5d)$$

$$V_{min}^2 \le Tr(M_h V) \le V_{max}^2 \quad \forall\, n \in \mathcal{N} \quad (5e)$$

$$(P_{ch}, Q_{c,h}) \in \mathcal{F}_h^{OID} \quad \forall\, h \in \mathcal{H} \quad (5f)$$

$$\overline{P}_{c,h} = P_{c,h},\; \overline{Q}_{c,h} = Q_{c,h} \quad \forall\, h \in \mathcal{H} \quad (5g)$$

where constraints (5g) ensure that utility and customer agree upon the inverters' setpoints, and $\overline{C}(V, \overline{p}_c, \overline{q}_c) := C_{utility}(V, \overline{p}_c) + G(\overline{p}_c, \overline{q}_c)$ is the regularized cost function to be minimized at the utility.

The consensus constraints (5g) render problems (4) and (5) equivalent; however, the same constraints impede problem decomposability, and thus conventional optimization techniques such as distributed (sub-)gradient methods and ADMM cannot be directly applied to solve (5) in a decentralized fashion. To enable problem decomposability, consider introducing the auxiliary variables $x_h$, $y_h$ per inverter h. Using these auxiliary variables, (5) can be reformulated as $$\min_{\substack{V, p_c, q_c \\ \overline{p}_c, \overline{q}_c, \{x_h, y_h\}}} \overline{C}(V, \overline{p}_c, \overline{q}_c) + \sum_{h \in \mathcal{H}} R_h(P_{c,h}) \quad (6a)$$

s. to $V \succeq 0$, (5b)-(5f), and $$\overline{P}_{c,h} = x_h,\; x_h = P_{c,h} \quad \forall\, h \in \mathcal{H} \quad (6b)$$

$$\overline{Q}_{c,h} = y_h,\; y_h = Q_{c,h} \quad \forall\, h \in \mathcal{H} \quad (6c)$$

Problem (6) is equivalent to (4) and (5); however, compared to (4)-(5), it is amenable to a decentralized solution via ADMM as described in the remainder of this section. ADMM may be preferred over distributed (sub-)gradient schemes because of its significantly faster convergence and resilience to communication errors.

Per inverter h, let $\overline{\gamma}_h$, $\gamma_h$ denote the multipliers associated with the two constraints in (17c), and $\overline{\mu}_h$, $\mu_h$ the ones associated with (17d). Next, consider the partial quadratically augmented Lagrangian of (6), defined as follows:

$$\mathcal{L}(\overline{\mathcal{P}}, \{\mathcal{P}_h\}, \mathcal{P}_{xy}, \mathcal{D}) := \quad (7)$$

$$\overline{C}(V, \overline{p}_c, \overline{q}_c) + \sum_{h \in \mathcal{H}} \Big[ R_h(P_{c,h}) + \overline{\gamma}_h(\overline{P}_{c,h} - x_h) + \gamma_h(x_h - P_{c,h}) +$$

$$\overline{\mu}_h(\overline{Q}_{c,h} - y_h) + \mu_h(y_h - Q_{c,h}) + (k/2)(\overline{P}_{c,h} - x_h)^2 +$$

$$(k/2)(x_h - P_{c,h})^2 + (k/2)(\overline{Q}_{c,h} - y_h)^2 + (k/2)(y_h - Q_{c,h})^2 \Big],$$

where $\overline{\mathcal{P}} := \{V, \overline{p}_c, \overline{q}_c\}$ collects the optimization variables of the utility; $\mathcal{P}_h := \{P_{c,h}, Q_{c,h}\}$ are the decision variables for customer h; $\mathcal{P}_{xy} := \{x_h, y_h, \forall h \in \mathcal{H}\}$ is the set of auxiliary variables; $\mathcal{D} := \{\overline{\gamma}_h, \gamma_h, \overline{\mu}_h, \mu_h, \forall h \in \mathcal{H}\}$ collects the dual variables; and k>0 is a given constant. Based on (7), ADMM amounts to iteratively performing the steps [S1]-[S3] described next, where i denotes the iteration index:

[S1] Update variables $\overline{\mathcal{P}}$ as follows:

$$\overline{\mathcal{P}}[i+1] := \arg\min_{V, \{\overline{P}_{c,h} \overline{Q}_{c,h}\}} \mathcal{L}(\overline{\mathcal{P}}, \{\mathcal{P}_h[i]\}, \mathcal{P}_{xy}[i], \mathcal{D}[i]) \quad (8)$$

s.to. $V \succeq 0$, and (5b)-(5e).

Furthermore, per inverter h, update $P_{c,h}, Q_{c,h}$ as follows:

$$\mathcal{P}_h[i+1] := \arg\min_{P_{c,h}, Q_{c,h}} \mathcal{L}(\overline{\mathcal{P}}[i], P_{c,h}, Q_{c,h}, \mathcal{P}_{xy}[i], \mathcal{D}[i]) \quad (9)$$

s.to. $(P_{c,h}, Q_{c,h}) \in \mathcal{F}_h^{OID}$

[S2] Update auxiliary variables $\mathcal{P}_{xy}$:

$$\mathcal{P}_{xy}[i+1] := \arg\min_{\{x_h, y_h\}} \mathcal{L}(\overline{\mathcal{P}}[i+1], \{\mathcal{P}_h[i+1]\}, \{x_h, y_h\}, \mathcal{D}[i]) \quad (10)$$

[S3] Dual update:

$$\overline{\gamma}_h[i+1] = \overline{\gamma}_h[i] + k(\overline{P}_{c,h}[i+1] - x_h[i+1]) \quad (11a)$$

$$\gamma_h[i+1] = \gamma_h[i] + k(x_h[i+1] - P_{c,h}[i+1]) \quad (11b)$$

$$\overline{\mu}_h[i+1] = \overline{\mu}_h[i] + k(\overline{Q}_{c,h}[i+1] - y_h[i+1]) \quad (11c)$$

$$\mu_h[i+1] = \mu_h[i] + k(y_h[i+1] - Q_{c,h}[i+1]) \quad (11d)$$

In [S1], the primal variables $\overline{\mathcal{P}}, \{\mathcal{P}_h\}$ are obtained by minimizing (7), where the auxiliary variables $\tau_{xy}$ and the multipliers $\mathcal{D}$ are kept fixed to their current iteration values. Likewise, the auxiliary variables are updated in [S2] by fixing $\overline{\mathcal{P}}, \{\mathcal{P}_h\}$ to their up-to-date values. Finally, the dual variables are updated in [S3] via dual gradient ascent.

It can be noticed that step [S2] favorably decouples into $2|\mathcal{H}|$ scalar and unconstrained quadratic programs, with $x_h[i+1]$ and $y_h[i+1]$ solvable in closed-form. Using this feature, the following lemma can be readily proved.

Lemma 1: Suppose that the multipliers are initialized as $\overline{\gamma}_h[0] = \gamma_h[0] = \overline{\mu}_h[0] = \mu_h[0] = 0$. Then, for all iterations i>0, it holds that:
i) $\overline{\gamma}_h[i] = \gamma_h[i]$;
ii) $\overline{\mu}_h[i] = \mu_h[i]$.
iii) $x_h[i] = \tfrac{1}{2}\overline{P}_{c,h}[i] + \tfrac{1}{2}P_{c,h}[i]$; and,
iv) $y_h[i] = \tfrac{1}{2}\overline{Q}_{c,h}[i] + \tfrac{1}{2}Q_{c,h}[i]$.

Using Lemma 1, the conventional ADMM steps [S1]-[S3] can be simplified as follows. [S1'] At the utility side, variables $\overline{\mathcal{P}}$ are updated by solving the following convex optimization problem:

$$\overline{\mathcal{P}}[i+1] := \arg\min_{V, \{\overline{P}_{c,h} \overline{Q}_{c,h}\}} \overline{C}(V, \overline{p}_c, \overline{q}_c) + F(\overline{p}_c, \overline{q}_c, \{\mathcal{P}_h[i]\}) \quad (12a)$$

s.to. $V \succeq 0$, and (5b)-(5e).

where function $F(\overline{p}_c, \overline{q}_c, \{\mathcal{P}_h[i]\})$ is defined as $$F(\overline{p}_c, \overline{q}_c, \{\mathcal{P}_h[i]\}) := \quad (12b)$$

$$\sum_{h \in \mathcal{H}} \Big[ \frac{k}{2}(\overline{P}_{c,h}^2 + \overline{Q}_{c,h}^2) + \overline{P}_{c,h}\Big(\gamma_h[i] - \frac{k}{2}\overline{P}_{c,h}[i] - \frac{k}{2}P_{c,h}[i]\Big) +$$

$$\overline{Q}_{c,h}\Big(\mu_h[i] - \frac{k}{2}\overline{Q}_{c,h}[i] - \frac{k}{2}Q_{c,h}[i]\Big) \Big]$$

At the customer side, the PV-inverter setpoints are updated by solving the following constrained quadratic program:

$$\mathcal{P}_h[i+1] := \operatorname{argmin}_{P_{c,h}Q_{c,h}}\Big[R_h(P_{c,h}) + \qquad (13)$$

$$\frac{k}{2}(P_{c,h}^2 + Q_{c,h}^2) - P_{c,h}\Big(\gamma_h[i] - \frac{k}{2}\overline{P}_{c,h}[i] - \frac{k}{2}P_{c,h}[i]\Big) -$$

$$Q_{c,h}\Big(\mu_h[i] - \frac{k}{2}\overline{Q}_{c,h}[i] - \frac{k}{2}Q_{c,h}[i]\Big)\Big]$$

$$\text{s. to. } (P_{c,h}, Q_{c,h}) \in \mathcal{F}_h^{OID}.$$

[S2'] At the utility and customer sides, the dual variables are updated as:

$$\gamma_h[i+1] = \gamma_h[i] + \frac{k}{2}(\overline{P}_{c,h}[i+1] - P_{c,h}[i+1]) \qquad (14a)$$

$$\mu_h[i+1] = \mu_h[i] + \frac{k}{2}(\overline{Q}_{c,h}[i+1] - Q_{c,h}[i+1]) \qquad (14b)$$

The resultant decentralized algorithm entails a two-way message exchange between the utility and customers of the current iterates $\overline{p}_c[i]$, $\overline{q}_c[i]$ and $p_c[i]$, $q_c[i]$. Specifically, at each iteration i>0, the utility-owned device solves the OID rendition (12) to update the desired PV-inverter setpoints based on the performance objectives described by $\overline{C}(V, \overline{p}_c, \overline{q}_c)$ (which is regularized with the term $F(\overline{p}_c, \overline{q}_c, \{\mathcal{P}_h[i]\})$ enforcing consensus with the setpoints computed at the customer side), as well as the electrical network constraints (5b)-(5e); once (12) is solved, the utility relays to each customer a copy of the iterate value $(\overline{P}_{c,h}[i+1], \overline{Q}_{c,h}[i+1])$. In the meantime, the PV-inverter setpoints are simultaneously updated via (13) and subsequently sent to the utility. Once the updated local iterates are exchanged, utility and customers update the local dual variables (14).

The resultant decentralized algorithm is tabulated as a first example implementation (Algorithm 1) listed below and illustrated in FIG. 4, and its convergence to the solution of the centralized OID problem (4) is formally stated next.

---

Algorithm 1 DOID: Utility-customer message passing

---

Set $\gamma_h[0] = \mu_h[0] = 0$ for all $h \in \mathcal{H}$
for i = 1, 2, . . . (repeat until convergence) do
  1. [Utility]: update V[i + 1] and $\{\overline{P}_{c,h}[i+1], \overline{Q}_{c,h}[i+1]\}$
    via (12).
    [Customer-h]: update $\overline{P}_{c,h}[i+1]$, $\overline{Q}_{c,h}[i+1]$ via (13).
  2. [Utility]: send $\overline{P}_{c,h}[i+1]$, $\overline{Q}_{c,h}[i+1]$ to h;
    repeat for all $h \in \mathcal{H}$
    [Customer-h]: receive $\overline{P}_{c,h}[i+1]$, $\overline{Q}_{c,h}[i+1]$ from utility;
    send $\overline{P}_{c,h}[i+1]$, $\overline{Q}_{c,h}[i+1]$ to utility;
    repeat for all $h \in \mathcal{H}$
    [Utility]; receive $\overline{P}_{c,h}[i+1]$, $\overline{Q}_{c,h}[i+1]$ from h;
    repeat for all $h \in \mathcal{H}$
  3. [Utility]: update $\{\gamma_h[i+1], \mu_h[i+1]\}_{h \in \mathcal{H}}$ via (14).
    [Customer-h]: update dual variables $\gamma_h[i+1], \mu_h[i+1]$
    via (14);
    repeat for all $h \in \mathcal{H}$
end for
Implement setpoints in the PV inverters.

---

Figure 4:
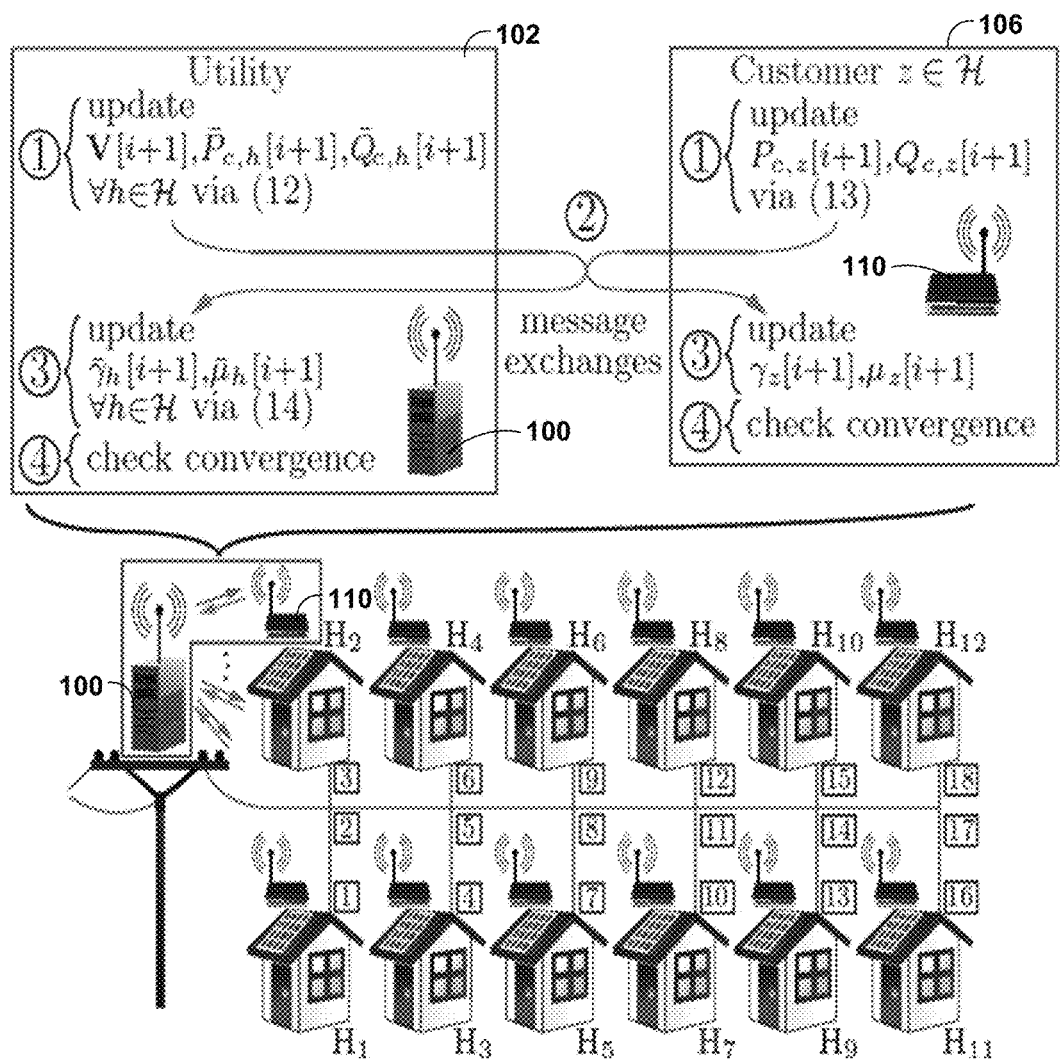
FIG. 4 is a block diagram illustrating operations and communications in a distributed optimal inverter dispatch (DOID) with utility-customer message passing according to a first example implementation.

FIG. 4 is a block diagram illustrating operations and communications in a distributed optimal inverter dispatch (DOID) with utility-customer message passing according to a first example implementation. As shown in FIG. 4, power utility 102 is coupled to a plurality of customer sites (e.g., customer site 106) by a power distribution network. Each customer site has installed therein a photovoltaic inverter and a respective controller. That is, control device 100 is configured to receive messages from the control devices of each of the customer sites, wherein each of the messages specify current measurements for the amount of reactive power and reactive power currently being produced by the photovoltaic inverter installed at the respective customer site. Controller 100 determines, based on the current measurements, set points for the active power and reactive power to be produced by each of the photovoltaic inverters of the customer sites by performing a minimization operation over the cost constraints for the utility so as to determine a minimum possible value for the cost, and communicates the updated set points for the active power and the reactive power to photovoltaic inverters.

Control device 100 of power utility 102 exchanges messages with each of the controllers (e.g., controller 110) and controls the real and reactive power produced by photovoltaic inverters installed at the customer sites. Each of the controllers at the customer sites measure an amount of active power and reactive power currently being produced by a photovoltaic inverter installed at the customer site, and send the measurements to the control device of the utility. Moreover, each of the controllers of the PVs receive the messages from control device 100 specifying the set points for the amount of reactive power and reactive power to be produced by the photovoltaic inverter installed at the respective customer site. Each of the controllers compute local set points based on a difference between the set points for the reactive power and the reactive power as received from the control device and the measured reactive power and reactive power currently being produced by the photovoltaic inverters. During this computation, each of the controllers performs a minimization operation over cost incurred by the respective customer site when the photovoltaic inverter for the customer site is required to curtail power generation. Each of the controllers then control the respective photovoltaic inverter in accordance with the local set points for the reactive power and the reactive power.

Proposition 1:

The iterates $\overline{\mathcal{P}}[i]$, $\{\mathcal{P}_h[i]\}$ and $\mathcal{D}[i]$ produced by [S1']-[S2'] are convergent, for any k>0. Further $$\lim_{i \to +\infty} V[i] = V^{opt},$$

$$\lim_{i \to +\infty} p_c[i] = \lim_{i \to +\infty} \overline{p}_c[i] = p_c^{opt}$$

and $$\lim_{i \to +\infty} q_c[i] = \lim_{i \to +\infty} \overline{q}_c[i] = q_c^{opt},$$

with $V^{opt}$, $p_c^{opt}$, $q_c^{opt}$ denoting the optimal solutions of the OID problems (4) and (5).

Notice that problem (12) can be conveniently reformulated in a standard SDP form (which involves the minimization of a linear function, subject to linear (in)equalities and linear matrix inequalities) by introducing pertinent auxiliary optimization variables and by using the Schur complement. Finally, for a given consensus error $0 < \epsilon \ll 1$, the algorithm terminates when $\|\overline{p}_c[i] - p_c[i]\|_2^2 + \|\overline{q}_c[i] - q_c[i]\|_2^2 \le \epsilon$. However, it is worth emphasizing that, at each iteration i, the utility company solves a consensus-enforcing regularized OID problem, which yields intermediate voltages and power flows that clearly adhere to electrical network constraints.

Once the decentralized algorithm has converged, the real and reactive setpoints are implemented in the PV inverters. Notice however that Algorithm 1 affords an online implementation; that is, the intermediate PV-inverter setpoints $\bar{p}_c[i], \bar{q}_c[i]$ are dispatched (and set at the customer side) as and when they become available, rather than waiting for the algorithm to converge.

DOID: Network Cluster Partitioning

Figure 5:
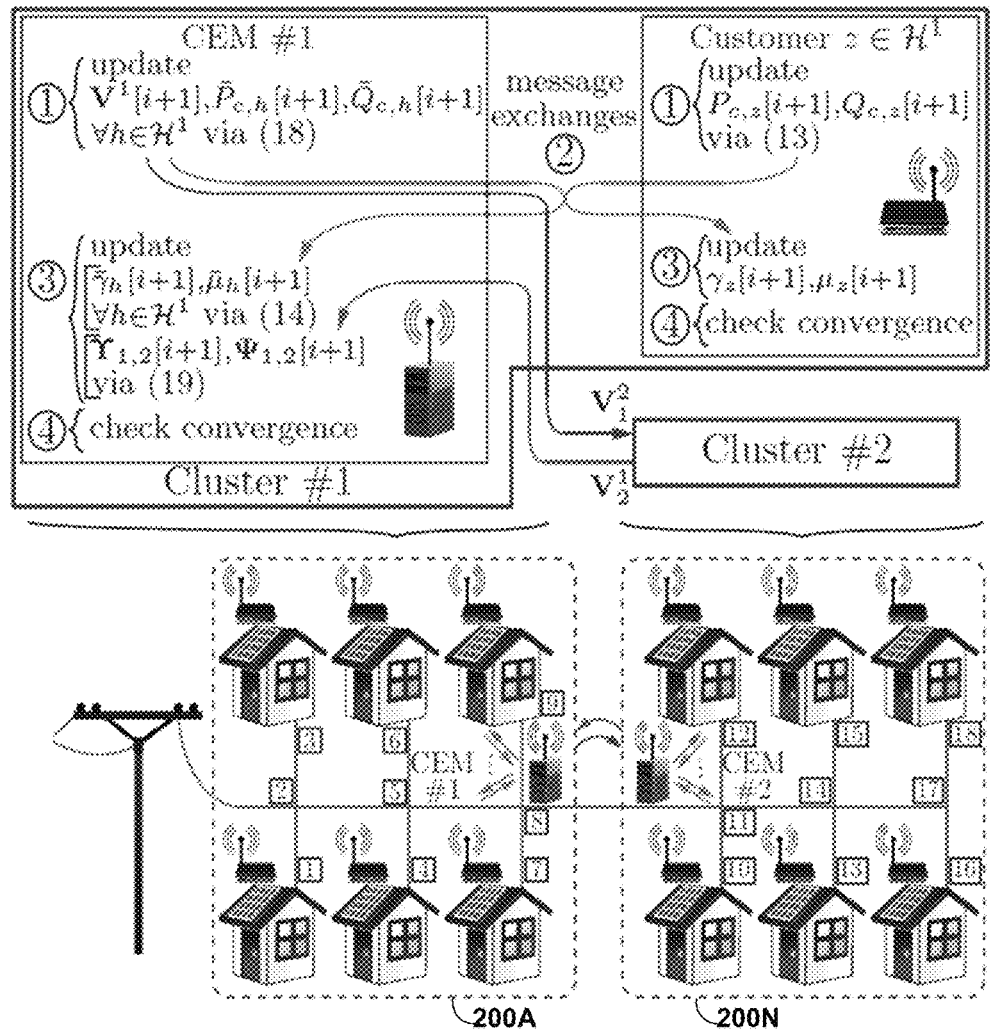
FIG. 5 is a block diagram illustrating operations and communications in a DOID with utility-customer message passing according to a second example implementation in which the distribution network is divided into clusters.

FIG. 5 is a block diagram illustrating operations and communications in a DOID with utility-customer message passing according to a second example implementation in which the distribution network is divided into clusters 200A-200N. In this setup, $C^1=\{1, \ldots, 9\}$, $\tilde{C}^1=\{1, \ldots, 9, 11\}$, $C^2=\{10, \ldots, 18\}$, and $\tilde{C}^2=\{8, 10, \ldots, 18\}$. The following sections describe a second example implementation, usable in combination of or an extension to the first example implementation, where the distribution network is partitioned into clusters, with $C^a \subset N$ denoting the set of nodes within cluster a. Also, define $\tilde{C}^a := C^a \cup \{n | (m, n) \in \varepsilon, m \in C^a, n \in C^j, a \neq j\}$; that is, $\tilde{C}^a$ also includes the nodes belonging to different clusters that are connected to the a-th one by a distribution line (see FIG. 5 for an illustration). Hereafter, superscript $(\cdot)^a$ will be used to specify quantities pertaining to cluster a; e.g., $\mathcal{H}^a$ the set of houses located within cluster $C^a$, and vectors $\bar{p}_c^a$, $\bar{q}_c^a$ collect copies of the setpoints of PV inverters $h \in \mathcal{H}^a$ available with the a-th CEM. With regard to notation, an exception is $V^a$, which denotes the sub-matrix of V corresponding to nodes in the extended cluster $\tilde{C}^a$.

Based on this network partitioning, consider decoupling the network-related cost $\bar{C}(V, \bar{p}_c, \bar{q}_c)$ in (5a) as $$\bar{C}(V, \bar{p}_c, \bar{q}_c) = \sum_{a=1}^{N_a} \underbrace{\left[ C^a(V^a, \bar{p}_c^a) + \lambda^a \sum_{h \in \mathcal{H}^a} \|[\bar{P}_{c,h}, \bar{Q}_{c,h}]\|_2 \right]}_{:=\bar{C}^a(V^a, \bar{p}_c^a, \bar{q}_c^a)}$$

where $N_a$ is the number of clusters, $C^a(V^a, \bar{p}_c^a)$ captures optimization objectives of the a-th cluster (e.g., power losses within the cluster), and the sparsity-promoting regularization function is used to determine which PV inverters in $\mathcal{H}^a$ provide ancillary services. Further, per-cluster $a=1, \ldots, N_a$, define the region of feasible power flows as [cf. (5b)-(5e)]:

$$\mathcal{R}^a := \left\{ V^a, \bar{p}_c^a, \bar{q}_c^a : \begin{array}{l} Tr(A_h^a V^a) = \bar{P}_h - \bar{P}_{c,h}, \forall h \in \mathcal{H}^a \\ Tr(B_h^a V^a) = -Q_{l,h} + \bar{Q}_{c,h}, \forall h \in \mathcal{H}^a \\ Tr(A_n^a V^a) = 0, \forall n \in \mathcal{U}^a \\ Tr(B_n^a V^a) = 0, \forall n \in \mathcal{U}^a \\ V_{min}^2 \leq Tr(M_n^a V^a) \leq V_{max}^2, \forall n \in \mathcal{C}^a \end{array} \right\}$$

where $A_h^a$, $B_h^a$ and $M_h^a$ are the sub-matrices of $A_h$, $B_h$, $M_h$, respectively, formed by extracting rows and columns corresponding to nodes in $\tilde{C}^a$. With these definitions, problem (5) can be equivalently formulated as:

$$\min_{V, \bar{p}_c, \bar{q}_c \atop \bar{p}_c, \bar{q}_c} \sum_a \left[ \bar{C}^a(V^a, \bar{p}_c^a, \bar{q}_c^a) + \sum_{h \in \mathcal{H}^a} R_h(P_{c,h}) \right] \quad (15a)$$

s. to $V \succeq 0$, and $$\{V^a, \bar{p}_c^a, \bar{q}_c^a\} \in \mathcal{R}^a \ \forall a \quad (15b)$$

$$(P_{c,h}, Q_{c,h}) \in \mathcal{F}_h^{OID} \ \forall h \in \mathcal{H}^a, \forall a \quad (15c)$$

$$\bar{P}_{c,h} = P_{c,h}, \bar{Q}_{c,h} = Q_{c,h} \ \forall h \in \mathcal{H}^a, \forall a. \quad (15d)$$

Notice that, similar to (5g), constraints (15d) ensure that the CEM and customer-owned PV systems consent on the optimal PV-inverter setpoints. Formulation (15) effectively decouples cost, power flow constraints, and PV-related consensus constraints (15d) on a per-cluster basis. The main challenge towards solving (15) in a decentralized fashion lies in the positive semidefinite (PSD) constraint $V \succeq 0$, which clearly couples the matrices $\{V^a\}$. To address this challenge, results on completing partial Hermitian matrices will be leveraged to identify partitions of the distribution network in clusters for which the PSD constraint on V would decouple to $V^a \succeq 0$, $\forall a$. This decoupling would clearly facilitate the decomposability of (15) in per-cluster sub-problems.

Towards this end, first define the set of neighboring clusters for the a-th one $\tilde{\mathcal{B}} := \{j : \tilde{C}^a \cap \tilde{C}^j \neq \emptyset\}$. Further, let $\mathcal{G}_C$ be a graph capturing the control architecture of the distribution network, where nodes represent the clusters and edges connect neighboring clusters (i.e., based on sets $\{\tilde{\mathcal{B}}^a\}$); for example, the graph $\mathcal{G}_C$ associated with the network in FIG. 5 has two nodes, connected through an edge (since the two areas are connected). In general, it is clear that if clusters a and j are neighbors, then CEM a and CEM j must agree on the voltages at the two end points of the distribution line connecting the two clusters. For example, with reference to FIG. 5, notice that line (8; 11) connects clusters 1 and 2. Therefore, CEM 1 and CEM 2 must agree on voltages $V_8$ and $V_{11}$. Lastly, let $V_j^a$ denote the sub-matrix of $V^a$ corresponding to the two voltages on the line connecting clusters a and j. Recalling the previous example, agreeing on $V_8$ and $V_{11}$ is tantamount to setting $V_2^1 = V_2^1$, where $V_2^1$ is a 2×2 matrix representing the outer-product $[V_8, V_{11}]^T [V_8, V_{11}]^*$. Using these definitions, the following proposition can be proved.

Proposition 2:

Suppose: (i) the cluster graph $\mathcal{G}_C$ is a tree, and (ii) clusters are not nested (i.e., $|\tilde{C}^a \setminus (\tilde{C}^a \cap \tilde{C}^j)| > 0 \ \forall a \neq j$). Then, (15) is equivalent to the following problem:

$$\min_{\{V^a, \bar{p}_c^a, \bar{q}_c^a\} \atop \bar{p}_c, \bar{q}_c} \sum_a \left[ \bar{C}^a(V^a, \bar{p}_c^a, \bar{q}_c^a) + \sum_{h \in \mathcal{H}^a} R_h(P_{c,h}) \right] \quad (16a)$$

s. to (15b)-(15d) and $$V^a \succeq 0 \ \forall a \quad (16b)$$

$$V_j^a = V_a^j, \ \forall j \in \tilde{\mathcal{B}}^a, \forall a \quad (16c)$$

Under (i)-(ii), there exists a rank-1 matrix $V^{opt}$ solving (15) optimally if and only if rank $\{V^a\}=1$, $\forall a=1, \ldots, N_a$. Notice that the $|\mathcal{N}| \times |\mathcal{N}|$ matrix V is replaced by percluster reduced-dimensional $|\tilde{C}^a| \times |\tilde{C}^a|$ matrices $\{V^a\}$ in (16). Proposition 2 is grounded on the assertion that a PSD matrix V can be obtained starting from submatrices $\{V^a\}$ if and only if the graph induced by $\{V^a\}$ is chordal. Since a PSD matrix can be reconstructed from $\{V^a\}$, it suffices to impose constraints $V^a \succeq 0$, $\forall a=1, \ldots, N_a$. Assumptions (i)-(ii) provide sufficient conditions for the graph induced by $\{V^a\}$ to be chordal, and they are typically satisfied in practice (e.g., when each cluster is set to be a lateral or a sub-lateral). The second part of the proposition asserts that, for the completable PSD matrix V to have rank 1, all matrices $V^a$ must have rank 1; thus, if rank $\{V^a\}=1$ for all clusters, then $\{V^a\}$ represents a globally optimal power flow solution for given inverter setpoints.

Similar to (6), auxiliary variables are introduced to enable decomposability of (16) in per-cluster subproblems. With variables $x_h$, $y_h$ associated with inverter h, and $W^{a,j}$, $Q^{a,j}$ with neighboring clusters a and j, (16) is reformulated as:

$$\min_{\substack{\{V^a, \overline{p}_c^a, \overline{q}_c^a\} \\ p_c^a, q_c^a \\ \{W^{a,j}, Q^{a,j}, x_h, y_h\}}} \sum_a \left[ \overline{C}^a(V^a, \overline{p}_c^a, \overline{q}_c^a) + \sum_{h \in \mathcal{H}^a} R_h(P_{c,h}) \right]$$

s. to (15b)-(15c), $V^a \succeq 0$ $\forall$ a, and $$\Re\{V_j^a\} = W^{a,j}, W^{a,j} = W^{j,a} \; \forall \; j \in \mathcal{B}^a, \forall \; a \quad (17a)$$

$$\Im\{V_j^a\} = Q^{a,j}, Q^{a,j} = Q^{j,a} \; \forall \; j \in \mathcal{B}^a, \forall \; a \quad (17b)$$

$$\overline{P}_{c,h} = x_h, x_h = P_{c,h} \; \forall \; h \in \mathcal{H}^a, \forall \; a \quad (17c)$$

$$\overline{Q}_{c,h} = y_h, y_h = Q_{c,h} \; \forall \; h \in \mathcal{H}^a, \forall \; a \quad (17d)$$

This problem can be solved across clusters by resorting to ADMM. To this end, a partial quadratically-augmented Lagrangian, obtained by dualizing constraints $\Re\{V_j^a\}=Q^{a,j}$, $\Im\{V_j^a\}=Q^{a,j}$, $\overline{P}_{c,h}=x_h$, and $\overline{Q}_{c,h}=y_h$ is defined first; then, the standard ADMM steps involve a cyclic minimization of the resultant Lagrangian with respect to $\{V^a, p_c^a, q_c^a, \overline{p}_c^a, \overline{q}_c^a\}$ (by keeping the remaining variables fixed); the auxiliary variables $\{W^{a,j}, Q^{a,j}, x_h, y_h\}$; and, finally, a dual ascent step. Lemma 1 still holds in the present case. Thus, using this lemma, the ADMM steps can be simplified as described next.

[S1"] Each PV system updates the local copy $\mathcal{P}_h[i+1]$ via (13); while, each CEM updates the voltage profile of its cluster, and the local copies of the setpoints of inverters $\mathcal{H}^a$ by solving the following convex problem:

$$\overline{\mathcal{P}}^a[i+1] := \quad (18a)$$

$$\underset{\substack{V^a, \overline{p}_c^a, \overline{q}_c^a \\ \{\alpha_j \geq 0, \beta_j \geq 0\}}}{\operatorname{argmin}} [\overline{C}^a(V^a, \overline{p}_c^a, \overline{q}_c^a) + F^a(\overline{p}_c^a, \overline{q}_c^a, \{\mathcal{P}_h[i]\}) +$$

$$F_V^a(V^a, \{V^j[i]\})]$$

s. to$\{V^a, \overline{p}_c^a, \overline{q}_c^a\} \in \mathcal{R}^a$, $V^a \succeq 0$, $\quad (18b)$ and:

$$\begin{bmatrix} -\alpha_j & a_j^T \\ a_j & -I \end{bmatrix} \preceq 0, \forall \; j \in \mathcal{B}^a \quad (18c)$$

$$\begin{bmatrix} -\beta_j & b_j^T \\ b_j & -I \end{bmatrix} \preceq 0, \forall \; j \in \mathcal{B}^a \quad (18d)$$

where vectors $a_j$ and $b_j$ collect the real and imaginary parts, respectively, of the entries of the matrix $V_j^a - \frac{1}{2}(V_j^a[i] + V_a^j[i])$; the regularization function $F^a(\overline{p}_c^a, \overline{q}_c^a, \{\mathcal{P}_h[i]\})$ enforcing consensus on the inverter setpoints is defined as in (12b) (but with the summation limited to inverters $\mathcal{H}^a$) and, $F_V^a(V^a, \{V^j[i]\})$ is given by:

$$F_V^a(V^a\{V^j[i]\}) := \quad (18e)$$

$$\sum_{j \in \mathcal{B}^a} \left[ \frac{k}{2}(\alpha_j + \beta_j) + Tr(\gamma_{a,i}^T[i]\Re\{V_j^a\}) + Tr(\Psi_{a,i}^T[i]\Im\{V_j^a\}) \right].$$

[S2"] Update dual variables $\{\gamma_h, \mu_h\}$ via (14) at both, the customer and the CEMs; variables $\{\gamma_{a,i}, \Psi_{a,i}\}$ are updated locally per cluster a=1, . . . $N_a$ as:

$$\gamma_{a,j}[i+1] = \gamma_{a,j}[I] + \frac{k}{2}(\Re\{V_j^a[i+1]\} - \Re\{V_a^j[i+1]\}) \quad (19a)$$

$$\Psi_{a,j}[i+1] = \Psi_{a,j}[I] + \frac{k}{2}(\Im\{V_j^a[i+1]\} - \Im\{V_a^j[i+1]\}) \quad (19b)$$

An example implementation of the resultant decentralized algorithm is shown below as Algorithm 2, illustrated in FIG. 5, and it involves an exchange of: (i) the local submatrices $\{V_j^a[i+1]\}$ among neighboring CEMs to agree upon the voltages on lines connecting clusters, where the submatrices convey information regarding the voltages on the line connecting two clusters; and, (ii) the local copies of the PV inverter setpoints between the CEM and customer-owned PV systems. Using arguments similar to Proposition 3, convergence of the algorithm can be readily established.

---

Algorithm 2 DOID: multi-cluster distributed optimization

Set $\gamma_h[0] = \mu_h[0] = 0$ for all h $\in$ $\mathcal{H}$ and for all clusters.
Set $Y_{a,j}[0] = \Psi_{a,j}[0] = 0$ for all pair of neighboring clusters.
for i = 1, 2, . . . (repeat until convergence) do
  1. [CEM-a]: update $V^a$ [i + 1] and $\overline{p}_c^a, \overline{q}_c^a$ via (18).
    [Customer-h]: update $P_{c,h}[i + 1], Q_{c,h}[i + 1]$ via (13).
  2. [CEM-a]: send $V_j^a[i + 1]$ to CEM j;
    [CEM-a]: receive $V_a^j[i + 1]$ to CEM j;

repeat $\forall j \in \mathcal{B}^a$.
  3. [CEM-a]: send $\overline{P}_{c,h}[i + 1], \overline{Q}_{c,h}[i + 1]$ to EMU-h;
    repeat for all h $\in$ $\mathcal{H}^a$.
    [Customer-h]: receive $\overline{P}_{c,h}[i + 1], \overline{Q}_{c,h}[i + 1]$ from CEM a;
    send $P_{c,h}[i + 1], Q_{c,h}[i + 1]$ to CEM a;
    repeat for h $\in$ H$^a$.
    [CEM-a]: receive $P_{c,h}[i + 1], Q_{c,h}[i + 1]$ from h;
    repeat for all h $\in$ $\mathcal{H}^a$.
  4. [CEM-a]: update $\{\gamma_h[i + 1], \mu_h[i + 1]\}_{h \in \mathcal{H}}$ via (14).
    [CEM-a]: update $\{Y_{a,j}[i + 1], \Psi_{a,j}[i + 1]\}$ via (19);
    [Customer-h]: update dual variables $\gamma_h[i + 1], \mu_h[i + 1]$
    via (14);
end for
Implement setpoints in the PV inverters.

---

Proposition 3:

For any k>0, the iterates $\{\overline{\mathcal{P}}^a[i]\}, \{\mathcal{P}_h[i]\}, \mathcal{D}[i]$ produced by [S1"]-[S2"] are convergent, and they converge to a solution of the OID problems (4) and (15).

Once the decentralized algorithm has converged, the real and reactive setpoints are implemented by the PV inverter controllers.

Finally, notice that the worst case complexity of an SDP is on the order $\mathcal{O}(\max\{N_c, N_v\}^4 \sqrt{N_v} \log(1/\epsilon))$ for general purpose solvers, with $N_c$, denoting the total number of constraints, $N_v$ the total number of variables, and $\epsilon > 0$ a given solution accuracy. It follows that the worst case complexity of (18) is markedly lower than the one of the centralized problem (4). Further, the sparsity of $\{A_n, B_n, M_n\}$ and the so-called chordal structure of the underlying electrical graph matrix can be exploited to obtain substantial computational savings.

SIMULATED RESULTS: Consider the distribution network in FIG. 1. The simulation parameters are set to check the consistency between the results of centralized and decentralized schemes. Specifically, the pole-pole distance is set to 50 m; lengths of the drop lines are set to 20 m; and voltage limits $V^{min}$, $V^{max}$ are set to 0.917 pu and 1.042 pu, respectively. The optimization package CVX[1] is employed to solve relevant optimization problems in MATLAB. In all the conducted numerical tests, the rank of matrices V and $\{V^a\}$ was always 1, meaning that globally optimal power flow solutions were obtained for given inverter setpoints.

Figure 6A:
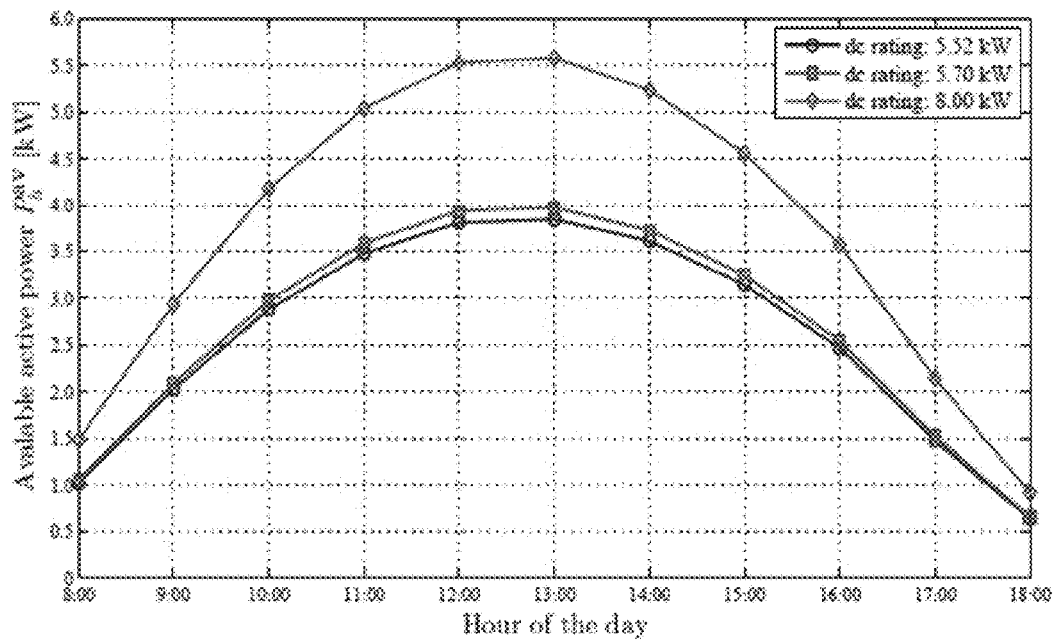
FIGS. 6A-6B are graphs of simulated inputs: (a) available active powers $\{P_h^{av}\}$ from inverters with dc ratings of 5.52 kW, 5.70 kW, and 8.00 kW; (b) demanded active loads at the households (reactive demand is computed by presuming a power factor of 0.9).

The available active powers $\{P_h^{av}\}_{h \in \mathcal{H}}$ are computed using the System Advisor Model (SAM)[2] of the National Renewable Energy Laboratory (NREL); specifically, the typical meteorological year (TMY) data for Minneapolis, Minn., during the month of July are used. All 12 houses feature fixed roof-top PV systems, with a dc-ac derating coefficient of 0.77. The dc ratings of the houses are as follows: 5.52 kW for houses $H_1$, $H_9$, $H_{10}$; 5.70 kW for $H_2$, $H_6$, $H_8$, $H_{11}$; and, 8.00 kW for the remaining five houses. The active powers $\{P_h^{av}\}$ generated by the inverters with dc ratings of 5.52 kW, 5.70 kW, and 8.00 kW are plotted in FIG. 6(a). It is assumed that the PV inverters are oversized by 10% of the resultant ac rating. The minimum power factor for the inverters is set to 0.85.

Figure 6B:
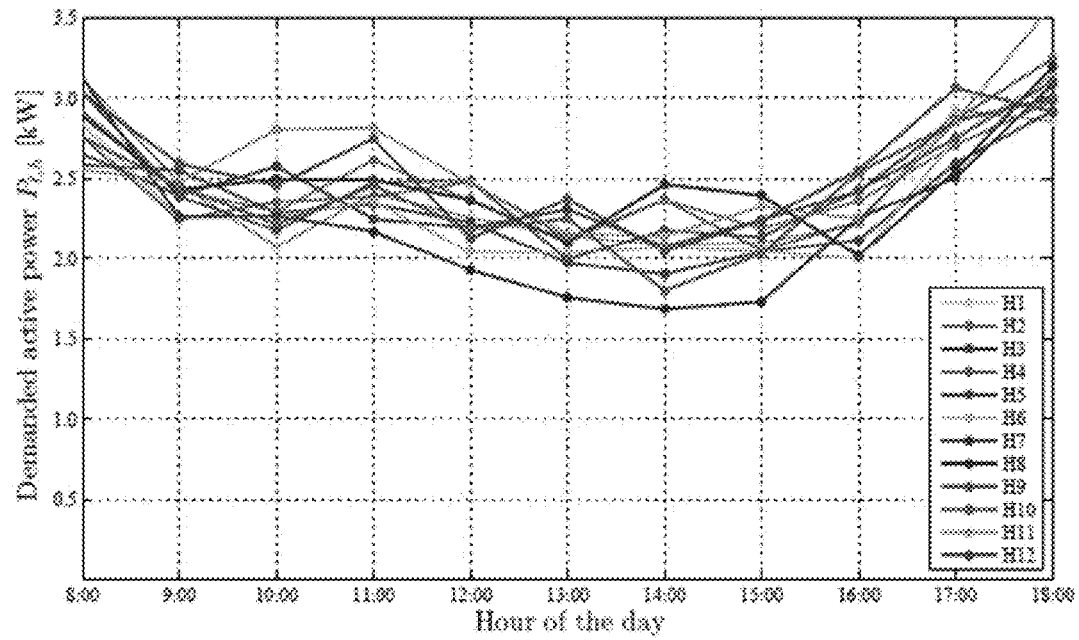

The residential load profile is obtained from the Open Energy Info database and the base load experienced in downtown Saint Paul, Minn., during the month of July is used for this test case. To generate 12 different load profiles, the base active power profile is perturbed using a Gaussian random variable with zero mean and standard deviation 200 W; the resultant active loads $\{P_{l,h}\}$ are plotted in FIG. 6(b). To compute the reactive loads $\{Q_{l,h}\}$, a power factor of 0.9 is presumed.

Figure 7A:
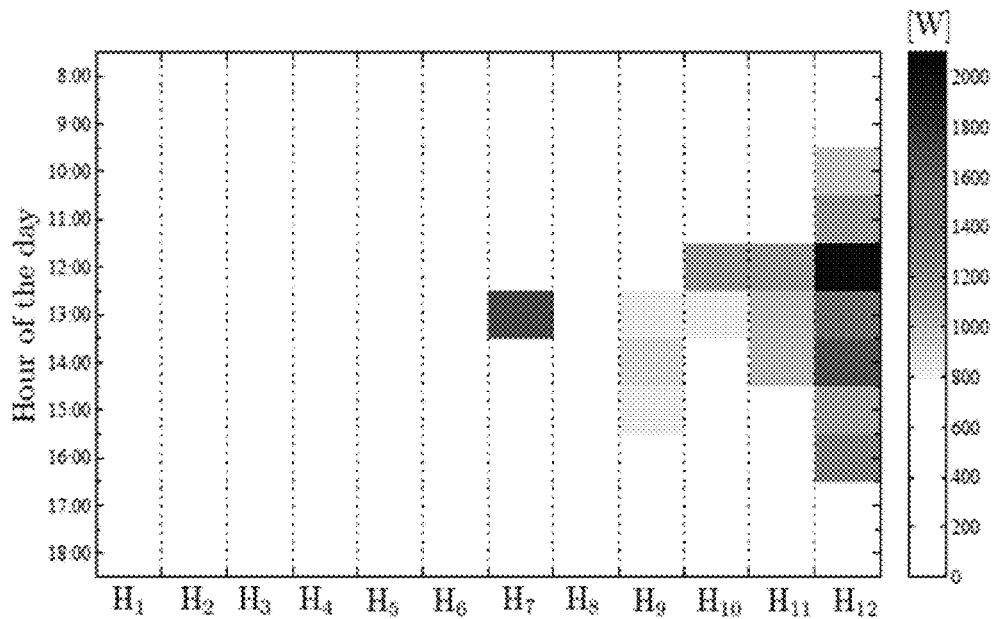
FIGS. 7A-7B are graphs illustrating an example solution, as determined according to the techniques herein, for curtailed active power per each household, for (a) $\lambda$=0.8 and (b) $\lambda$=0.
Figure 7B:
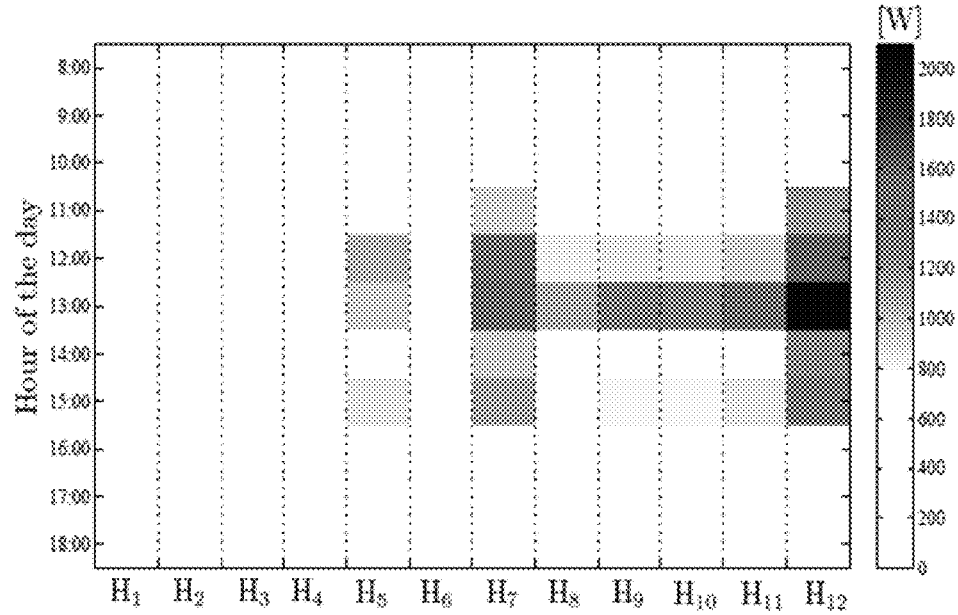

Assume that the objective of the utility company is to minimize the power losses in the network; that is, upon defining the symmetric matrix $L_{mn} := \Re\{y_{mn}\}(e_m - e_n)(e_m - e_n)^T$ per distribution line $(m,n) \in \varepsilon$, function $C_{utility}(V, \bar{p}_c)$ is set to $C_{utility}(V, \bar{p}_c) = \text{Tr}(LV)$, with $L := \Sigma_{(m,n) \in \varepsilon} L_{mn}$. At the customer side, function $R_h(P_{c,h})$ is set to $R_h(P_{c,h}) = 0.1 P_{c,h}$. The impact of varying the parameter $\lambda$ is illustrated in FIG. 7, where the solution of the centralized OID problem (4) is reported for different values of the parameter $\lambda$. Specifically, FIG. 7(a) illustrates the active power curtailed from each inverter during the course of the day when $\lambda = 0.8$, whereas the result in FIG. 7(b) were obtained by setting $\lambda = 0$. It is clearly seen that in the second case all inverters are controlled; in fact, they all curtail active power from 8:00 to 18:00. When $\lambda = 0.8$, the OID seeks a trade off between achievable objective and number of controlled inverters. It is clearly seen that the number of participating inverters grows with increasing solar irradiation, with a maximum of 7 inverters operating away from the business-as-usual point at 13:00.

Figure 8A:
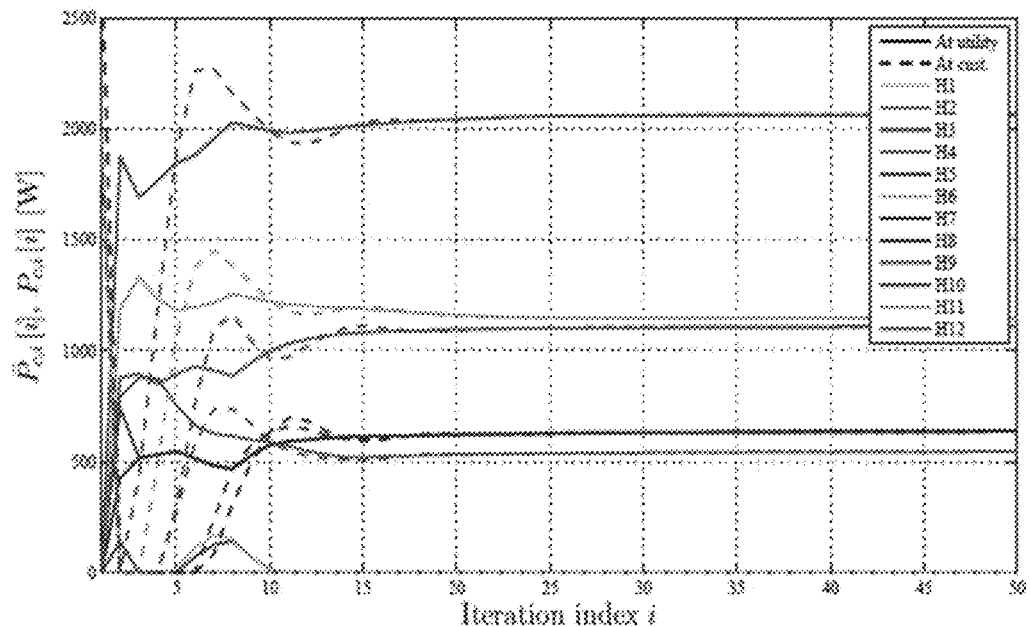
FIGS. 8A, 8B are graphs illustrating convergence of the first example implementation of the DOID techniques for: (a) values of $\{P_{c,h}[i]\}_{h \in \mathcal{H}}$ (dashed lines) and $\{\bar{P}_{c,h}[i]\}_{h \in \mathcal{H}}$ as a function of the ADMM iteration index i. (b) Consensus error|$P_{c,h}[i]-\bar{P}_{c,h}[i]$|, for all houses h$\in\mathcal{H}$ as a function of i.
Figure 8B:
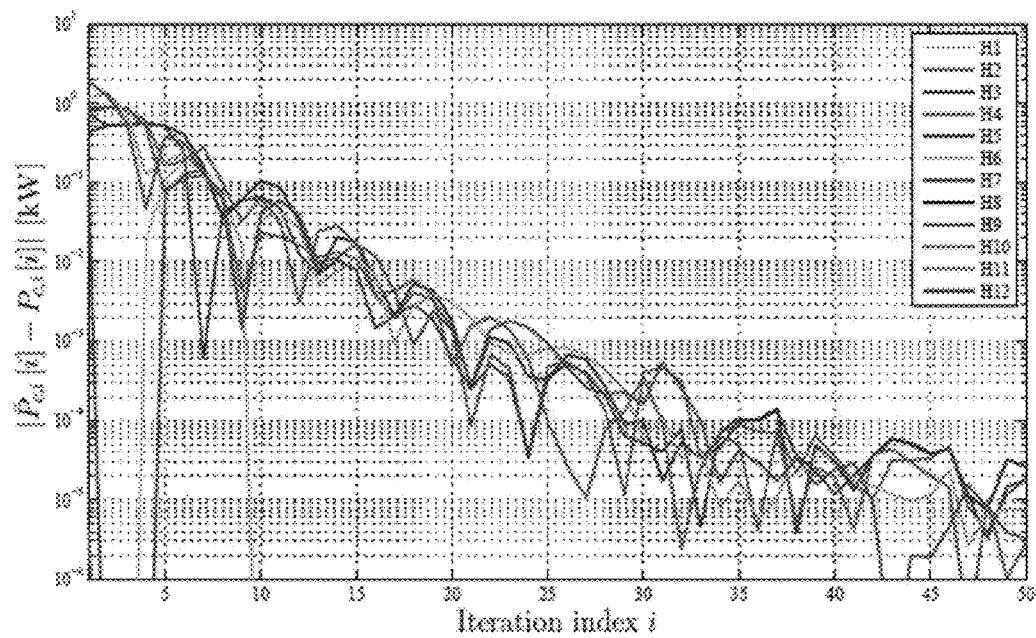

The convergence of the first example implementation (Algorithm 1) is showcased for $\lambda = 0.8$, $C_{utility}(V, \bar{p}_c) = \text{Tr}(LV)$, and $R_h(P_{c,h}) = 0.1 P_{c,h}$, and by utilizing the solar irradiation conditions at 12:00. FIGS. 8A, 8B are graphs illustrating convergence of the first example implementation of the DOID techniques for: (a) values of $\{P_{c,h}[i]\}_{h \in \mathcal{H}}$ dashed lines) and $\{\bar{P}_{c,h}[i]\}_{h \in \mathcal{H}}$ as a function of the ADMM iteration index i. (b) Consensus error $|P_{c,h}[i] - \bar{P}_{c,h}[i]|$, for all houses $h \in \mathcal{H}$ as a function of i. In particular, FIG. 8A depicts the trajectories of the iterates $\{P_{c,h}[i]\}_{h \in \mathcal{H}}$ (dashed lines) and $\{\bar{P}_{c,h}[i]\}_{h \in \mathcal{H}}$ (solid lines) for all the houses $H_1$-$H_{12}$. The results match the ones in FIG. 7A; in fact, at convergence (i.e., for iterations $i \geq 20$), only inverters at houses $H_7$-$H_{12}$ are controlled, and the active power curtailment set-points are in agreement. This result is expected, since problems (4) and (5) are equivalent; the only difference is that (4) affords only in centralized solution, whereas (5) is in a form that is suitable for the application of the ADMM to derive distributed solution schemes. Finally, the trajectories of the set-point consensus error $|P_{c,h}[i] - \bar{P}_{c,h}[i]|$, as a function of the ADMM iteration index i are depicted in FIG. 8B. It can be clearly seen that the algorithm converges fast to a set-point that is convenient for both utility and customers. Similar trajectories were obtained for the reactive power setpoints.

Figure 9:
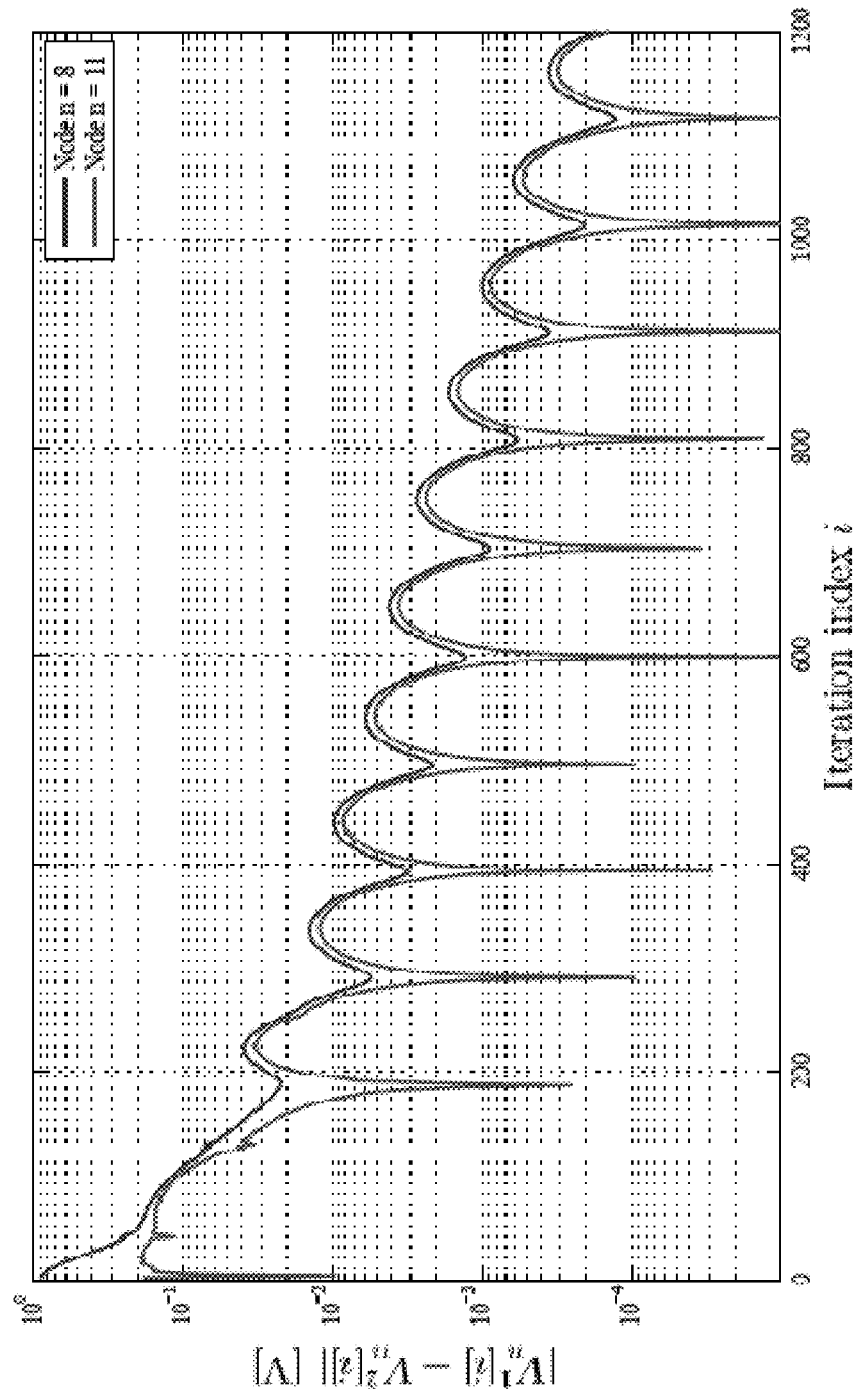
FIG. 9 is a graph illustrating consensus error |$V_8^1[i]-V_8^2[i]$| and |$V_{11}^1[i]-V_{11}^2[i]$| for the second example implementation of the DOID techniques as a function of the ADMM iteration index i.

FIG. 9 represents the discrepancies between local voltages on the line (8; 11); specifically, the trajectories of the voltage errors $|V_8^1[i] - V_8^2[i]|$ and $|V_{11}^1[i] - V_{11}^2[i]|$ are reported as a function of the ADMM iteration index i. The results indicate that the two CEMs consent on the voltage of the branch that connects the two clusters. The "bumpy" trend is typical of the ADMM. Similar trajectories were obtained for the inverter setpoints.

Figure 10:
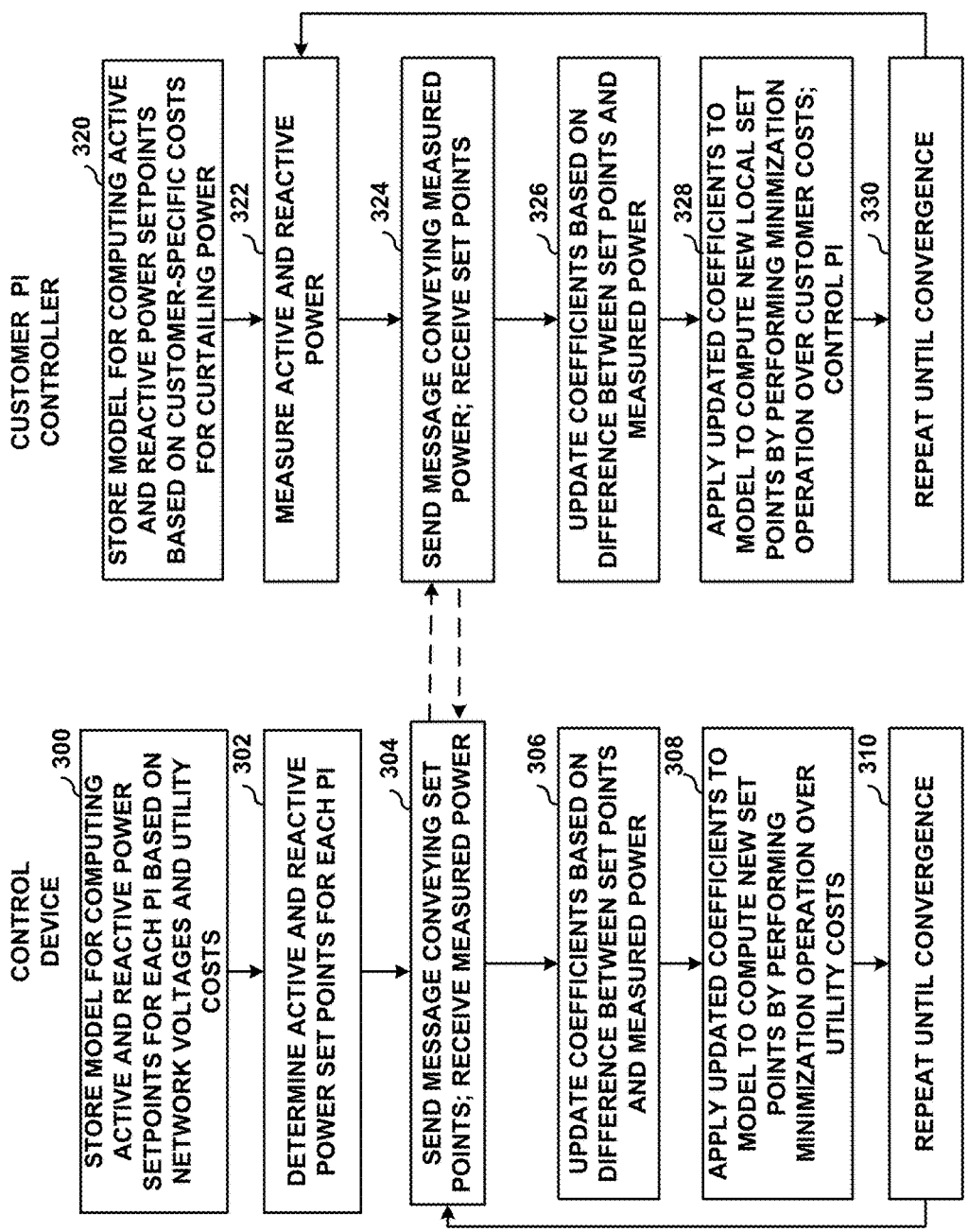
FIG. 10 is a flowchart illustrating example operation of a device in accordance with the techniques described herein.

FIG. 10 is a flowchart illustrating example operation and message exchange for a control device of a power utility (or cluster) and a PI controller for a customer in accordance with the techniques described herein. The devices may, for example, be implemented as a server, cloud-based processing system or other device having a processor or other operating environment for implementing the techniques described herein. In other words, the flowchart of FIG. 5 provides a high level overview of the detailed example implementations of Table 1 and Table 2. For purposes of explanation, FIG. 9 will be described with respect to control device 100 and controllers 110 of FIG. 4.

Initially, control device 100 for the utility and controllers 110 for the photovoltaic inverter (PI) at the customer sites are programmed with respective models having cost constraints, as described herein, for computing set points for the real and reactive power to be produced by photovoltaic inverters installed at respective customer sites and connected to a utility by a power distribution network (300, 320). In particular, control device 110 for the power utility is programmed to compute the setpoints based on estimated voltages for the distribution network and by applying a minimization operation to utility-specific costs, such as power losses in the network and voltage deviations. Each PV controller is programmed with a model for computing the setpoints for the real and reactive power by applying a minimization operation to customer-specific costs, such as costs to the individual customer in the event the respective PV is required to curtail power.

Control device 110 of the power utility (or cluster) and controllers 100 for the customer sites engage in a message exchange to iteratively and jointly converge to an optimal setpoints for the overall PV system. For example, control device 110 for the power utility applies the model to determine initial active and reactive set points for each PV and outputs messages to each controller so as to convey the set points (302, 304). In addition, each controller located at the customer sites measures the actual active an reactive power currently being produced by the PV and outputs messages to the control device so as to convey the actual measurements (322, 324).

Responsive to responsive to receiving the messages from the customer sites, control device 110 for the power utility updates one or more coefficients (dual variables) in the OID model based on the difference between the current set points it computed for the reactive power and the reactive power and the reactive power and reactive power currently being produced by the photovoltaic inverters (306). Control device 110 applies the model to compute updated set points based on the updated coefficients and sends the updated set points to each of the PV controllers (308, 304).

At each customer site, the respective controller receives the messages from the control devices specifying the updated set points for the active and reactive power to be produced by the photovoltaic inverter installed at the respective customer site (as determined by the power utility) and computes local set points based on a difference between the received set points and the measured reactive power and reactive power currently being produced by the photovoltaic inverters. At this time, the controller updates coefficients (dual variables) of its local model, computes the local set points by performing a minimization function over its programmed, customer-specific costs and controls the respective photovoltaic inverter in accordance with the local set points for the reactive power and the reactive power (326, 328).

Control device 110 and the PV controllers at each customer site repeat this message exchange and distributed computation of set points until the set points for the real power and the reactive power as computed by the power utility and the set points for the respective real power and reactive power as computed by the inverter controller at each of the customer sites converge within a threshold difference (310, 330). For the technique described herein where the power distribution network is partitioned into clusters, the message exchange process described above continues until the set points computed by the power utility/aggregator converge to a first threshold difference from the set points computed by the customer controllers, and the difference between matrices specifying voltages of power lines connecting neighboring clusters also converges to a second threshold difference. Each of the threshold differences may be user specified.

Figure 11:
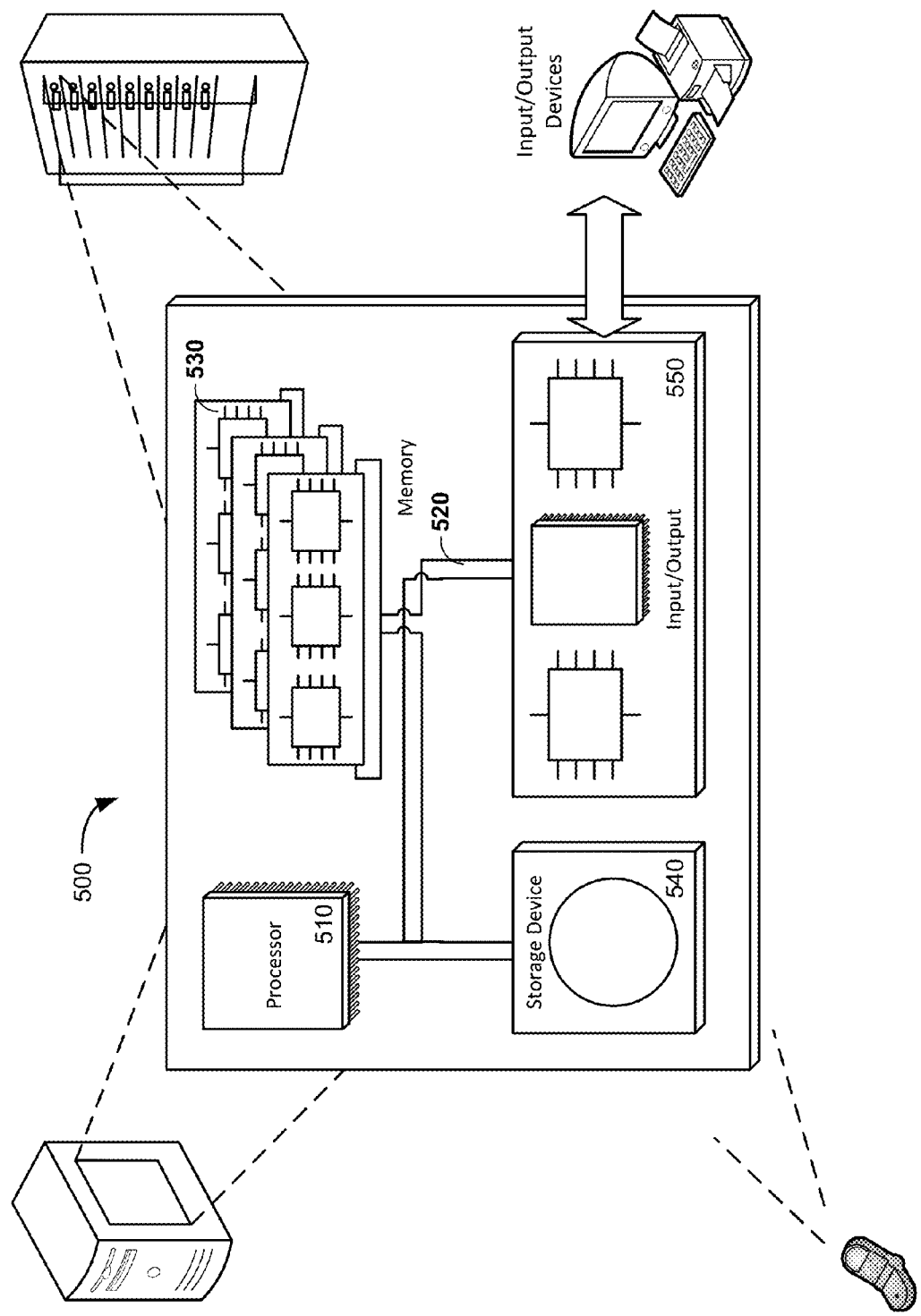
FIG. 11 shows a detailed example of a computing device or controller that may be configured to implement various embodiments in accordance with the current disclosure.

FIG. 11 shows a detailed example of a computing device that may be configured to implement some embodiments in accordance with the current disclosure. For example, device 500 may be a workstation, a computing center, a cluster of servers or other example embodiments of a computing environment capable of executing the techniques described herein. The example device of FIG. 10 may, for example, implement any portion or combination of the techniques described herein as a utility control device, a cluster energy manager or a controller deployed at a customer site. In this example, a computer 500 includes a hardware-based processor 510 that may be incorporated into a controller or any device to execute program instructions or software, causing the computer to perform various methods or tasks, such as performing the techniques described herein.

Processor 510 may be a general purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules. A suite of decentralized approaches for computing optimal real and reactive power setpoints for residential photovoltaic (PV) inverters were developed. The described decentralized optimal inverter dispatch strategy offers a comprehensive framework to share computational burden and optimization objectives across the distribution network, while highlighting future business models that will enable customers to actively participate in distribution-system markets.

Various embodiments of the invention have been described. These and other embodiments are within the scope of the following claims.

The invention claimed is:

1. A method, the method comprising:
storing, with a control device of a power distribution network, an optimal inverter dispatch (OID) model for controlling the real and reactive power produced by photovoltaic inverters installed at respective customer sites and connected to a utility by the power distribution network, wherein the model includes data representing estimated voltages at nodes within the power distribution network and an amount of active and reactive power currently being produced by each of the photovoltaic inverters, and wherein the OID model specifies a set of one or more cost constraints for the utility;
receiving, with the control device, messages from customer controllers at each of the customer sites, wherein each of the messages specify current measurements for the amount of active and reactive power currently being produced by the photovoltaic inverter installed at the respective customer site;
determining, by the control device and based on the OID model and the current measurements, set points for the active and reactive power to be produced by each of the photovoltaic inverters of the customer sites by performing a minimization operation over the cost constraints for the utility; and
communicating, by the control device, to the customer controllers at each of the customer sites, the updated set points for the active and reactive power to photovoltaic inverters.

2. The method of claim 1,
wherein the OID model comprises a semidefinite relaxation programming model that expresses the active power and reactive power for the photovoltaic inverters and the cost constraints as linear functions; and
wherein processing the OID model comprises computing the set points as a convex minimization for the estimates of the active and reactive power to be produced at each of the PV inverters.

3. The method of claim 1, wherein determining the set points comprises determining, for each of the photovoltaic inverters, updated set points based on a difference between previous set points for the active and reactive power of the photovoltaic inverter and the active and reactive power currently being produced by the photovoltaic inverter.

4. The method of claim 3, wherein determining the set points comprises:
responsive to receiving the messages from the customer controllers at each of the customer sites, updating, by the control device, one or more coefficients in the OID model based on the difference between the current set points for the active and reactive power and the active and reactive power currently being produced by the photovoltaic inverters;
computing, by the control device, the updated set points based on the updated coefficients; and
repeatedly, by the control device:
sending the updated set points to the customer controllers at each of the customer sites,
receiving the messages from the customer controllers at each of the customer sites,
updating the coefficients, and
computing additional updates to the set points until the set points for the active and reactive power and the current measurements for the active and reactive power converge within a threshold difference.

5. The method of claim 1, further comprising:
measuring, at each of the customer sites with the customer controllers at each of the customer sites, active and reactive power currently being produced by the respective photovoltaic inverters;
receiving, with each of the customer controllers, the messages from the control device specifying the updated set points current for the active and reactive power to be produced by the photovoltaic inverter installed at the respective customer site;
computing, with each of the customer controllers, local set points based on a difference between the set points for the active and reactive power as received from the control device and the measured active and reactive power currently being produced by the photovoltaic inverters; and
controlling, with each of the customer controllers, the respective photovoltaic inverter in accordance with the local set points for the active and the reactive power.

6. The method of claim 5, wherein computing, with each of the customer controllers, local set points comprises performing a minimization operation over cost incurred by the respective customer sites when the photovoltaic inverter for the customer site is required to curtail power generation.

7. The method of claim 1, wherein the control device comprises multiple control devices, the method further comprising:
partitioning the power distribution network in to a plurality of clusters, each of the clusters comprising at least one of the multiple control devices and a respective subset of the customer sites; and
performing, with each of the at least one of the multiple control devices, the method of claim 1 to control the amount of active and reactive power currently being produced by each of the photovoltaic inverters of the respective subset.

8. The method of claim 1, further comprising selecting, in real-time, a subset of the photovoltaic inverters to participate in the provisioning.

9. The method of claim 1, wherein processing the OID model comprises applying alternating direction method of multipliers (ADMM).

10. A method comprising:
measuring, with a customer controller at a customer site, an amount of active and reactive power currently being produced by a photovoltaic inverter installed at the customer site;
receiving, with the customer controller, messages from a control device of a power distribution network of a utility coupled to the customer site by the power distribution network, wherein the messages specify set points for the amount of active and reactive power to be produced by the photovoltaic inverter installed at the respective customer site;
computing, with the customer controller, local set points based on a difference between the set points for the active and reactive power as received from the control device and the measured active and reactive power currently being produced by the photovoltaic inverters; and
controlling, with the customer controller, the respective photovoltaic inverter in accordance with the local set points for the active and the reactive power.

11. The method of claim 10, wherein computing the local set points comprises performing a minimization operation over cost incurred by the customer controller at the customer site when the photovoltaic inverter for the customer site is required to curtail power generation.

12. A system comprising:
a control device for a power distribution network of a power utility;
a plurality of customer sites having customer controllers and respective photovoltaic inverters coupled to the power utility by the power distribution network,
wherein the control device stores an optimal inverter dispatch (OID) model for controlling real and reactive power produced by photovoltaic inverters installed at the customer sites, the OID model specifying a set of one or more cost constraints for the utility, and
wherein the control device is configured to:
  receive messages from the customer controller at each of the customer sites, wherein each of the messages specify current measurements for the amount of active and reactive power currently being produced by the photovoltaic inverter installed at the respective customer site,
  determine, based on the OID model and the current measurements, set points for the active and reactive power to be produced by each of the photovoltaic inverters of the customer sites by performing a minimization operation over the cost constraints for the utility, and
  communicate, to the customer controllers, the updated set points for the active and reactive power to photovoltaic inverters.

13. The system of claim 12,
wherein the OID model comprises a semidefinite relaxation programming model that expresses the active and reactive power for the photovoltaic inverters and the cost constraints as linear functions; and
wherein the control device computes the set points as a convex minimization for the estimates of the active and reactive power to be produced at each of the photovoltaic inverters.

14. The system of claim 12, wherein the control device is configured to determine, for each of the photovoltaic inverters, the updated set points based on a difference between previous set points for the active and reactive power of the photovoltaic inverter and the active and reactive power currently being produced by the photovoltaic inverter.

15. A control device a power distribution network, the control device comprising:
a processor coupled to a memory storing an optimal inverter dispatch (OID) model for controlling the real and reactive power produced by photovoltaic inverters installed at respective customer sites and connected to a utility by the power distribution network, wherein the model includes data representing estimated voltages at nodes within the power distribution network and an amount of active and reactive power currently being produced by each of the photovoltaic inverters, and wherein the OID model specifies a set of one or more cost constraints for the utility,
wherein the processor is configured to:
  receive messages from customer controllers at each of the customer sites, wherein each of the messages specify current measurements for the amount of active and reactive power currently being produced by the photovoltaic inverter installed at the respective customer site,
  determine, based on the OID model and the current measurements, set points for the active and reactive power to be produced by each of the photovoltaic inverters of the customer sites by performing a minimization operation over the cost constraints for the utility, and
  communicate, to the customer controllers, the updated set points for the active and reactive power to photovoltaic inverters.

16. The control device of claim 15,
wherein the OID model comprises a semidefinite relaxation programming model that expresses the active and reactive power for the photovoltaic inverters and the cost constraints as linear functions; and
wherein the control device computes the set points as a convex minimization for the estimates of the active and reactive power to be produced at each of the PV inverters.

17. The control device of claim 15, wherein the control device is configured to determine, for each of the photovoltaic inverters, the updated set points based on a difference between previous set points for the active and reactive power of the photovoltaic inverter and the active and reactive power currently being produced by the photovoltaic inverter.

18. A photovoltaic inverter controller comprising:
circuitry coupling the device to a photovoltaic inverter;
a processor coupled to a memory,
wherein the processor is configured to:
  measure an amount of active and reactive power currently being produced by the photovoltaic inverter;
  receive messages from a control device of a utility coupled to the photovoltaic inverter by a power distribution network, wherein the messages specify set points for the amount of active and reactive power to be produced by the photovoltaic inverter;
  compute local set points based on a difference between the set points for the active and the reactive power as received from the control device and the measured active and reactive power currently being produced by the photovoltaic inverters; and
  control the photovoltaic inverter in accordance with the local set points for the active and reactive power.

19. The photovoltaic inverter controller of claim 18, wherein the processor is configured to compute the local set points by performing a minimization operation over cost incurred by the customer site when the photovoltaic inverter for the customer site is required to curtail power generation.

20. The photovoltaic inverter controller of claim 18, further comprising a communication interface configured to:
send information to the control device that is indicative of the amount of active and reactive power currently being produced by the photovoltaic inverter to the control device; and receive the messages from the control device of the utility in response to sending the information.

* * * * *